(12) United States Patent
Beglan

(10) Patent No.: US 9,266,029 B2
(45) Date of Patent: Feb. 23, 2016

(54) TRANSFORMABLE CABLE VOLUME STRUCTURE

(71) Applicant: Philip Michael Peter Beglan, Bristol (GB)

(72) Inventor: Philip Michael Peter Beglan, Bristol (GB)

(*) Notice: Subject to any disclaimer, the term of this patent is extended or adjusted under 35 U.S.C. 154(b) by 0 days.

(21) Appl. No.: 14/386,767

(22) PCT Filed: Mar. 27, 2013

(86) PCT No.: PCT/EP2013/056625
§ 371 (c)(1),
(2) Date: Sep. 19, 2014

(87) PCT Pub. No.: WO2013/144258
PCT Pub. Date: Oct. 3, 2013

(65) Prior Publication Data
US 2015/0174500 A1 Jun. 25, 2015

(30) Foreign Application Priority Data

Mar. 30, 2012 (GB) .................................. 1205755.0

(51) Int. Cl.
| | | |
|---|---|---|
| *A63H 3/36* | (2006.01) | |
| *A63H 3/04* | (2006.01) | |
| *A63H 13/00* | (2006.01) | |
| *B25J 1/02* | (2006.01) | |
| *B25J 11/00* | (2006.01) | |

(52) U.S. Cl.
CPC .................. *A63H 3/04* (2013.01); *A63H 3/365* (2013.01); *A63H 13/00* (2013.01); *B25J 1/02* (2013.01); *B25J 11/003* (2013.01); *Y10T 74/20323* (2015.01)

(58) Field of Classification Search
USPC ........... 446/85, 102, 107, 109, 330, 331, 370, 446/373, 374, 375; 434/82, 83
See application file for complete search history.

(56) References Cited

U.S. PATENT DOCUMENTS

| | | | | |
|---|---|---|---|---|
| 1,555,661 | A |   | 9/1925 | Grove |
| 2,241,576 | A | * | 5/1941 | Barton .......................... 446/361 |
| 2,421,279 | A | * | 5/1947 | Marty ........................... 446/331 |
| 3,284,947 | A | * | 11/1966 | Dahl .............................. 446/374 |
| 3,395,484 | A | * | 8/1968 | Smith ............................ 446/374 |
| 4,136,484 | A | * | 1/1979 | Abrams ........................ 446/370 |
| 4,197,358 | A | * | 4/1980 | Garcia ........................ 428/542.4 |
| 4,393,728 | A | * | 7/1983 | Larson et al. .................... 74/469 |
| 4,683,773 | A | * | 8/1987 | Diamond ................... 74/490.04 |
| 5,017,173 | A | * | 5/1991 | Shapero et al. ............... 446/374 |
| 5,297,443 | A | * | 3/1994 | Wentz ........................ 74/490.04 |

(Continued)

FOREIGN PATENT DOCUMENTS

WO 2013144258 A1 10/2013

*Primary Examiner* — Kurt Fernstrom
(74) *Attorney, Agent, or Firm* — Loza & Loza, LLP; Gabriel Fitch

(57) ABSTRACT

A structure comprises an elongate, resiliently deformable cable, a body section comprising a cable-receiving aperture, said aperture being dimensioned so as to retain a length of said cable within it in use while permitting relative movement of said cable relative to the aperture in a direction along the length of the cable upon application of a set manipulating force, and retaining means for retaining the cable at a set position relative to the body section absent application of said force, wherein the cable at least partially defines the shape of the structure, and said shape may be changed by application of said manipulating force thus causing relative movement between the cable and the body section in a direction along the length of the cable.

20 Claims, 26 Drawing Sheets

(56) References Cited

U.S. PATENT DOCUMENTS

| | | | |
|---|---|---|---|
| 5,741,140 A * | 4/1998 | Bristol | 434/82 |
| 5,762,531 A * | 6/1998 | Witkin | 446/374 |
| 5,766,701 A * | 6/1998 | Lee | 428/9 |
| 5,800,242 A * | 9/1998 | Clokey | 446/374 |
| 6,074,270 A * | 6/2000 | Wilcox et al. | 446/370 |
| 6,170,721 B1 * | 1/2001 | Chen | 223/85 |
| 6,773,327 B1 * | 8/2004 | Felice et al. | 446/330 |
| 6,790,398 B1 * | 9/2004 | Ejima et al. | 264/251 |
| 6,800,016 B2 * | 10/2004 | Wittenberg et al. | 446/373 |
| 7,479,054 B2 * | 1/2009 | Wittenberg et al. | 446/373 |
| 7,592,053 B2 * | 9/2009 | Mansfield | 428/12 |
| 8,182,418 B2 * | 5/2012 | Durant et al. | 600/142 |
| 8,571,711 B2 * | 10/2013 | Jacobsen et al. | 700/247 |
| D706,352 S * | 6/2014 | Hardy et al. | D20/31 |
| 8,992,421 B2 * | 3/2015 | Stand et al. | 600/142 |
| 9,028,292 B2 * | 5/2015 | Benecke et al. | 446/375 |
| 2005/0041048 A1 | 2/2005 | Hillman et al. | |

\* cited by examiner

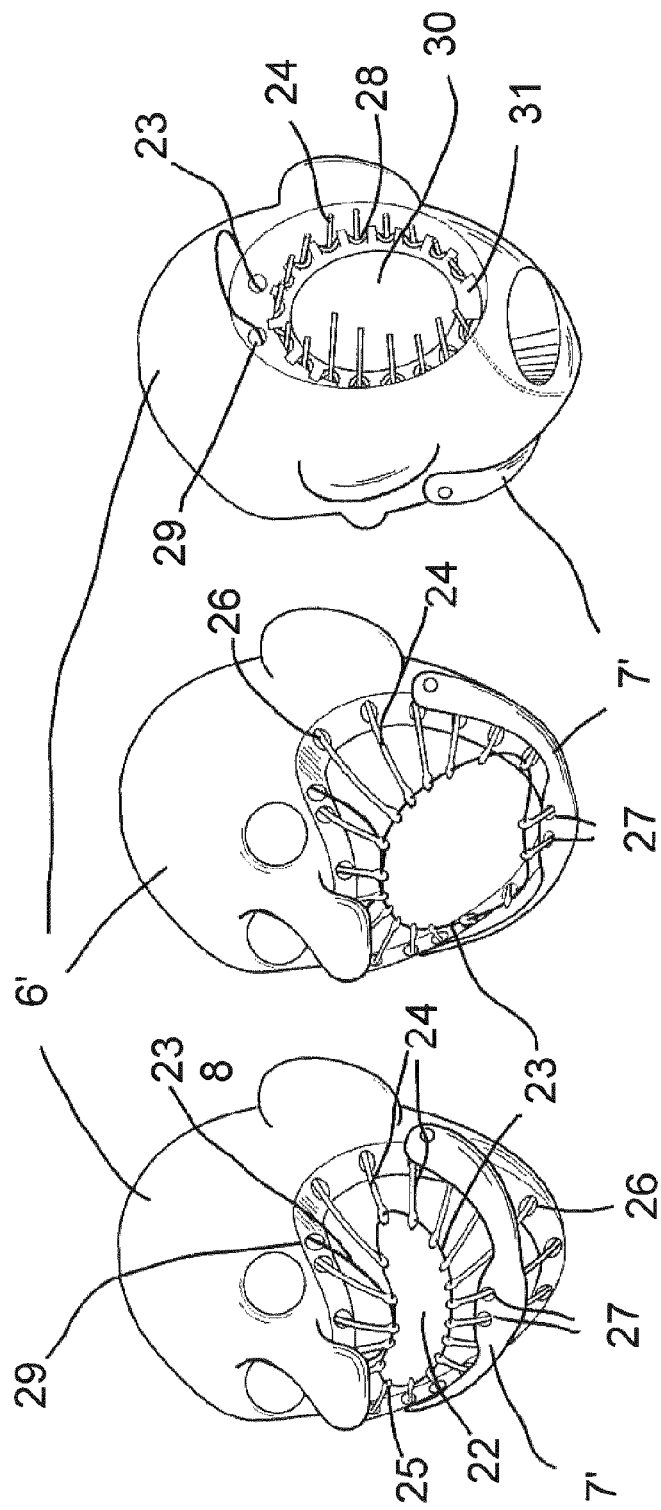

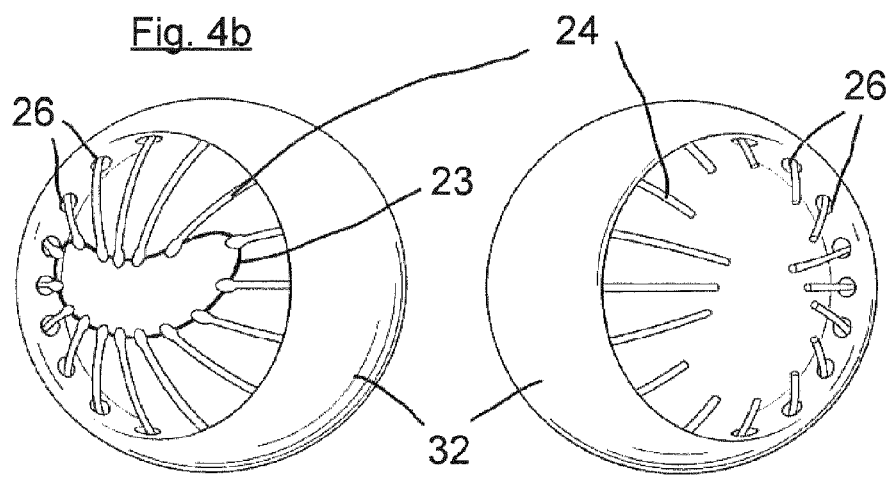
Fig. 4b
Fig. 4a
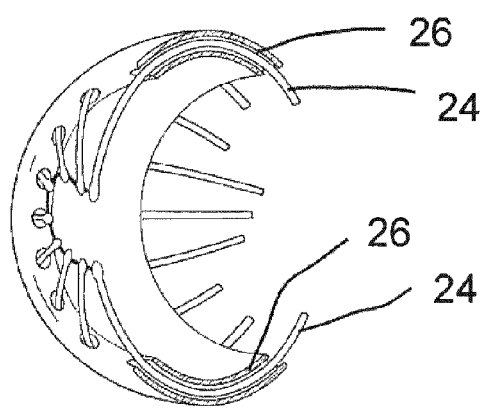
Fig. 4c

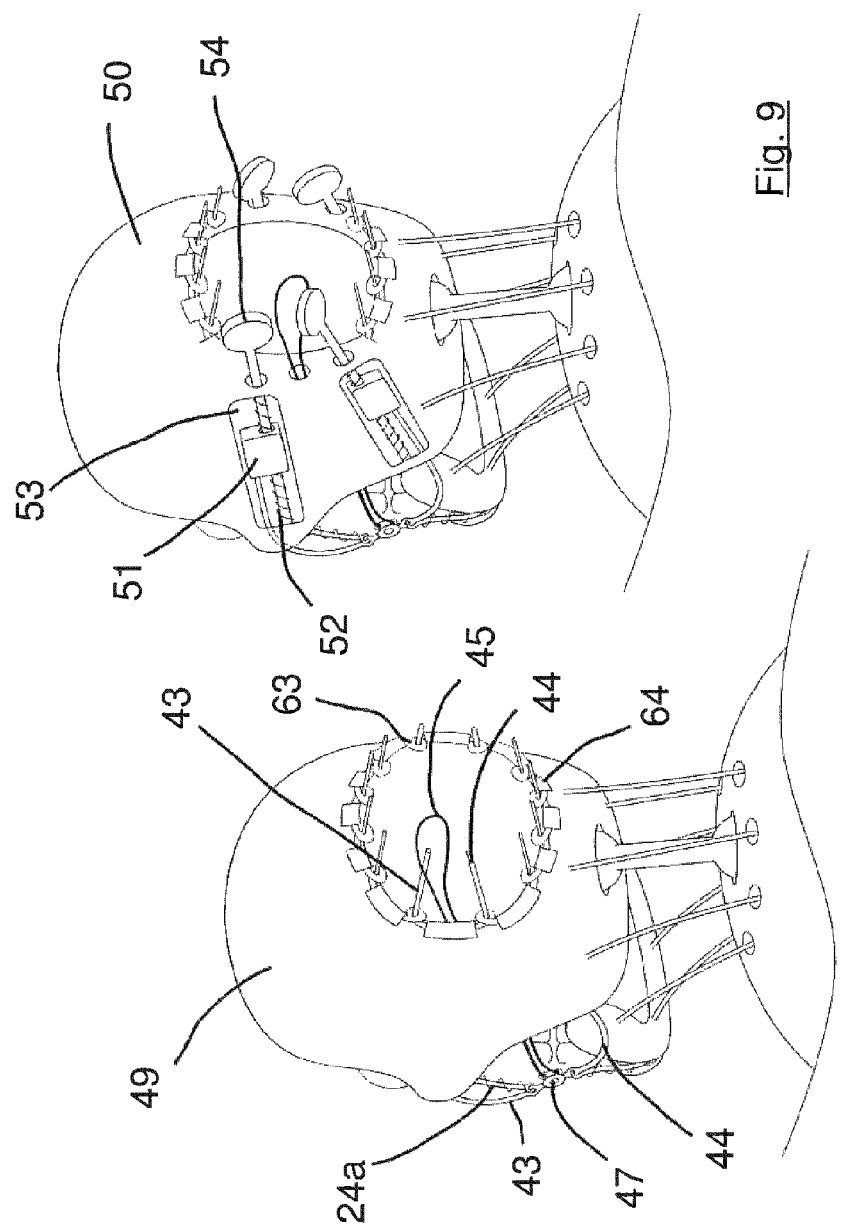

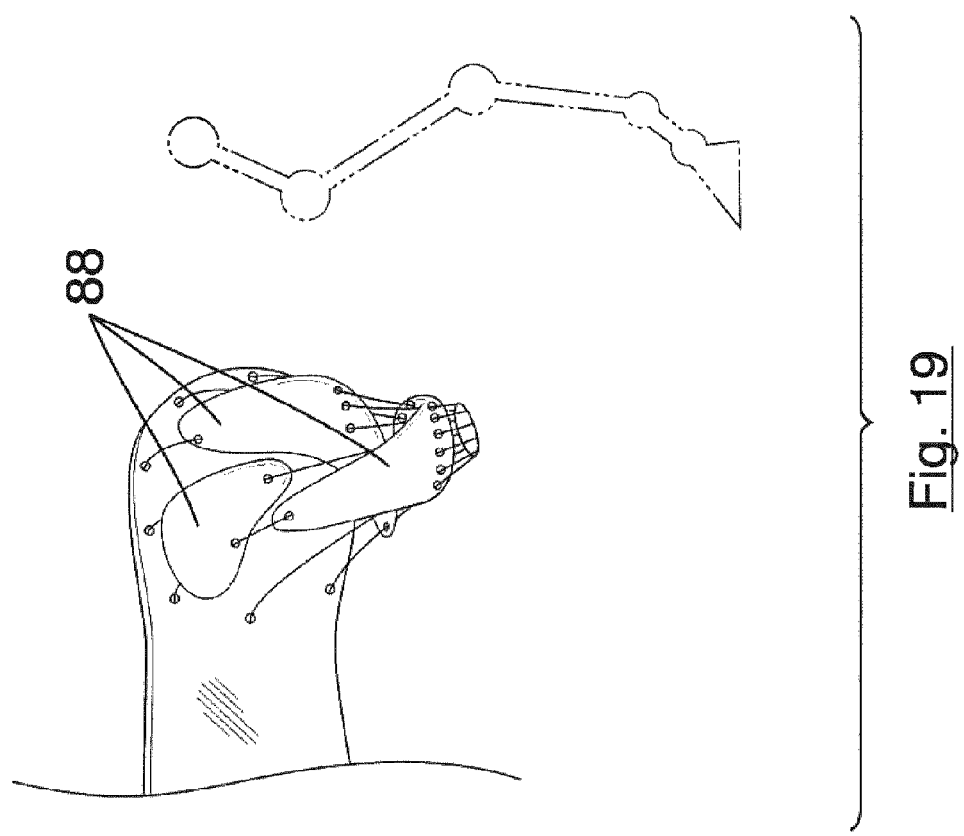

TRANSFORMABLE CABLE VOLUME STRUCTURE

CROSS REFERENCE TO RELATED APPLICATIONS

This application is the U.S. national stage of International Patent Application No. PCT/EP2013/056625, filed on 27 Mar. 2013 and entitled TRANSFORMABLE CABLE STRUCTURE, which claims the benefit of priority from Great Britain Application No. 1205755.0, filed 30 Mar. 2012. The disclosures of the foregoing applications are incorporated herein by reference in their entirety.

BACKGROUND

This invention relates to a structure of changeable shape. Such structures may be of application in many different fields, for example, but not limited to, toys, puppets, sculptures, prosthetic equipment, animatronics, robots or dolls.

In a particular embodiment, such a structure may find application in the field of stop motion animation, and for the sake of example only, it is this application which will be described in more detail herein.

Stop motion animation is a well-known form of animation in which in order to create the illusion of movement of a figure, the figure is photographed in a time sequence, where the figure is incrementally moved between each photograph. It is therefore necessary to use a figure which is capable both of small, incremental movements, and which can remain in a set position once so moved.

Conventionally, such a figure comprises a number of elements. For a human body figure for example, the body may include an articulated skeleton, which defines and limits the major body movements possible, e.g. raising an arm, bending a knee, while preventing impossible or unlikely movements, e.g. flexing the middle of a thighbone. Set around the skeleton will be a body form which defines the volumetric shape of the figure. This will typically comprise a bulky yet flexible material, such as sponge, foam rubber, Plasticine®, clay or the like. This can be carved or set to form the required body shape. Sometimes, around the body form is a body covering (i.e. "skin"), which is flexible to allow movement of the figure. Typically, silicone or rubber may be used for this purpose. In addition, the covering layer may be provided with relief features, so that features of the figure may be accentuated.

There are various problems associated with such known figures. For example, a large volume of material (foam, plasticine etc) is required for the body form. In addition, when the figure is manipulated, the foam material is prone to loss of volume, creasing or rippling, which detracts from the realism of the figure. Furthermore, such figures typically suffer from a relatively poor range of movement of certain body features, for example a figure's neck, limbs, mouth and eyebrows.

SUMMARY

It is an aim of the present invention to provide a body which overcomes all of these problems. This aim is achieved by providing a new type of structure, which makes use of "free-riding" cables, i.e. cables which are free to move relative to the body form. This aim and its achievement are of course equally applicable to the other fields mentioned above.

It is noted here that it is known to use cabling within puppetry figures. For example, in the field of animatronics, it has been known to effect movement of a figure (for example a crocodile's tail) by pulling a cable. This type of arrangement is known from U.S. Pat. No. 5,297,443. It is noted that such a cable is neither resiliently deformable nor does it act to define any part of the tail structure.

For the purposes of the present invention, it is to be understood that the term "body" is used to encompass structures whether resembling humans, animals, or any other creatures or objects for which movement is possible.

In accordance with a first aspect of the present invention there is provided a structure comprising:
an elongate, resiliently deformable cable,
a body section comprising a cable-receiving aperture, said aperture being dimensioned so as to retain a length of said cable within it in use while permitting relative movement of said cable relative to the aperture in a direction along the length of the cable upon application of a set manipulating force, and
retaining means for retaining the cable at a set position relative to the body section absent application of said force,
wherein the cable at least partially defines the shape of the structure, and said shape may be changed by application of said manipulating force thus causing relative movement between the cable and the body section in a direction along the length of the cable.

The body section may be rigid.

The structure may further comprise an actuable member which engages with said cable, such that movement of said cable relative to the body section causes corresponding movement of the actuable member relative to the body section. The retaining means may comprise a skeleton connected to the body section and to the actuable member, to control the relative positions of the body section and actuable member.

The retaining means may apply a frictional force between the cable and the body section to prevent relative movement therebetween.

The structure may comprise a plurality of elongate, resiliently-deformable cables, and the body section may comprise a plurality of cable-receiving apertures, each said aperture being dimensioned so as to retain a length of a respective cable within it in use while permitting relative movement of said cable relative to the respective aperture in a direction along the length of said cable upon application of a respective set manipulating force, and retaining means for retaining each cable at a set position relative to the body section absent application of said force, wherein the cables at least partially define the shape of the structure, and said shape may be changed by application of a said manipulating force. The plurality of cables may define the shape of at least a section of the body.

The structure may further comprise a covering layer which at least partially covers the structure, and wherein the cable is carried underneath the covering layer.

The cable may be fixedly attached to the structure at a point along the length of said cable, such that said cable has at least one free end. The structure may comprise a sleeve for restraining said free end in a direction transverse to the length of said cable at that end.

At least one cable may be at least partially guided by a further body section at a point along its length.

The structure may further comprise a cable attached to the body section, and non-fixedly carried by the actuable member.

Each cable may be carried by a part of the structure at a position intermediate to, and spaced from, the ends of the said cable.

The actuable member may comprise a flexible member, and wherein the plurality of cables co-operate with the flexible member, such that movement of a cable relative to the body section in a direction along the length of said cable causes corresponding movement of the flexible member relative to the body section. Each cable may engage with the flexible member at an end of the cable, such that the positions of the respective engaging ends of said cables are spaced along the extent of the flexible member. Each said cable may lie substantially orthogonal to the flexible member at the respective engagement position. The engagement between each cable and the flexible member may be loose, such that the flexible member may move relative to the cable. Alternatively, the engagement between each cable and the flexible member may be fixed, such that the flexible member may not move relative to the cable. The flexible member may be elastic. The elastic flexible member may comprise an elastic cord. The elastic, flexible member may comprise a portion of the covering layer. Alternatively, the flexible member may comprise substantially inelastic cord. The structure may comprise an elastic guide which engages with the inelastic cord. The inelastic cord may be formed in a loop, such that pulling on a portion of the loop causes relative movement of the flexible member and said cables.

The flexible member may define an aperture of the structure. The structure may comprise a control means for adjusting the position of the aperture with respect to the body section. The control means may comprise a link which engages with one of said cables and lies in a non-parallel direction to said cable, such that movement of the link along its axis causes corresponding movement of the cable in that direction. The structure may comprise a further link which engages with a further cable, connected to the first said cable, the arrangement being such that differential movement of the first and second links causes rotation of the flexible member. The or each link may comprises a cable. Alternatively, the or each link may comprise an arm. The or each arm may be mounted for rotational movement relative to the body section.

A link clamp may be mounted to the body form which in use applies a frictional force to the or each link, acting to prevent movement of said link relative to the body section.

Each said cable may carry a damper affixed thereto, to control rotational movement of said cable relative to the body section. The body section may comprise a metallic region underneath the dampers, and the dampers comprise magnets for magnetic attraction to the metallic region. The dampers may comprise a non-magnetic covering around the magnets, to prevent substantial magnetic interaction between magnets of respective dampers.

The cable-receiving aperture may comprise a channel formed in the body section.

The cable may be driven in a direction along its length by an actuator.

The structure may be formed as a body suitable for stop-motion animation. The flexible member may in use define a body part. The body part may comprise eyebrows of the body.

The aperture may comprise a mouth of the body.

The cables may define a body part.

In accordance with a second aspect of the present invention there is provided a kit of parts comprising:
at least one resiliently deformable elongate member, said member comprising at least one aperture and at least one protrusion extending from a surface of said member, and
a plurality of resiliently deformable cables with means for attachment to said protrusions,
said at least one aperture being dimensioned so as to retain a length of one of said plurality of cables within it in use while permitting relative movement of said cable relative to the aperture in a direction along the length of the cable upon application of a set manipulating force.

BRIEF DESCRIPTION OF THE DRAWINGS

The invention will now be described with reference to the accompanying drawings, in which:

FIGS. 3a-c schematically show a third embodiment of the present invention for controlling mouth movements;

FIG. 4a-c schematically show a simple mouth controller in accordance with the present invention;

FIG. 9 schematically shows the an oblique view of the rear of an alternative head section in accordance with the present invention.

FIG. 19 shows a horse leg configuration in accordance with the present invention.

DETAILED DESCRIPTION

Figure 1:
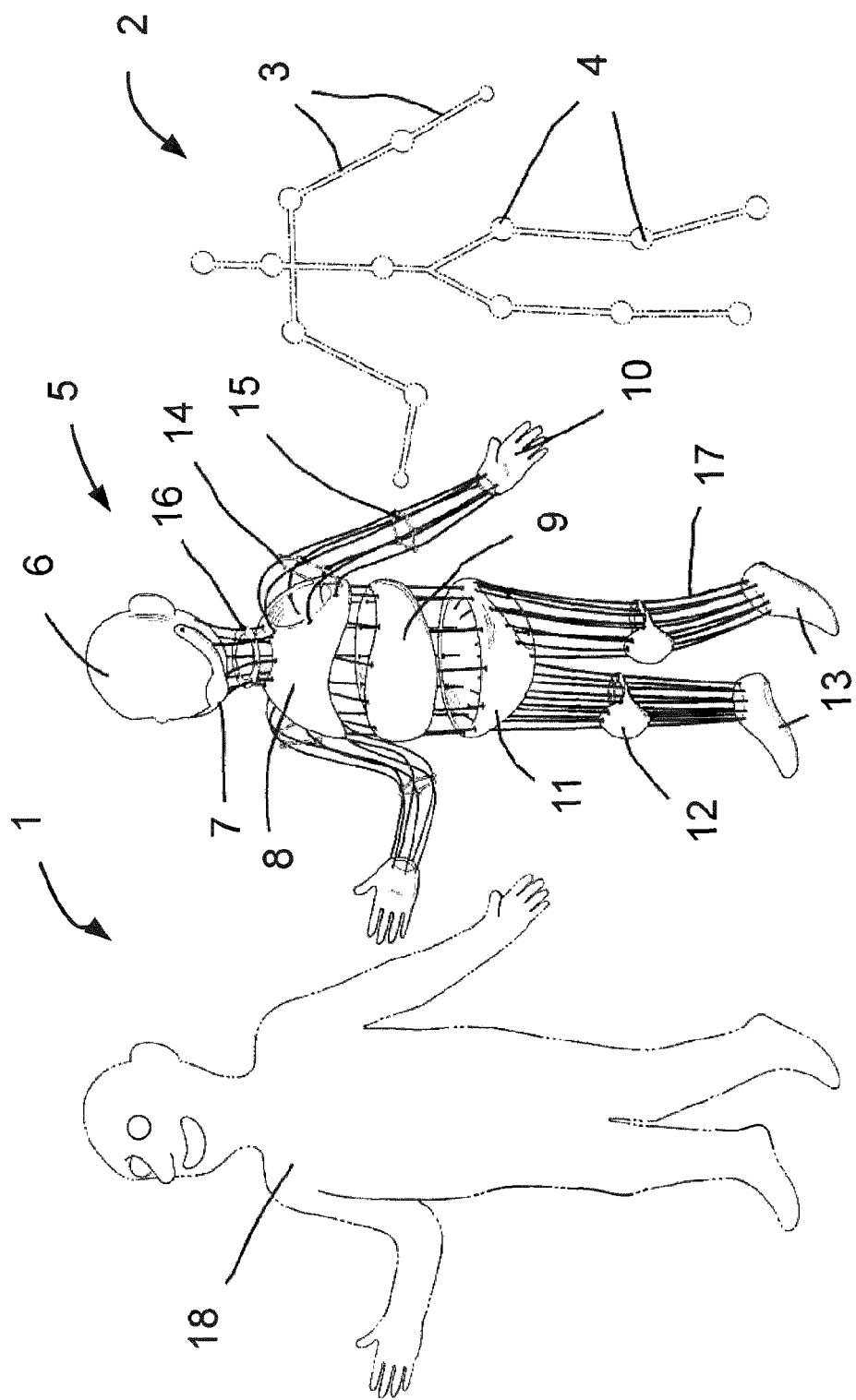
FIG. 1 schematically shows an exploded view of a body in accordance with an embodiment of the present invention.

A first embodiment of the invention is schematically shown in FIG. 1. More specifically, FIG. 1 shows an exploded view of a structure body 1, which for simplicity is selected as being of generally human form. The right-most image shows an articulated skeleton 2, generally similar to that known in the art. The skeleton is formed from a number of rigid lengths 3, which for a human puppet body substantially correspond to major bones of a human skeleton. These rigid lengths 3 are connected at joints 4, which allow pivoting between adjacent lengths 3. The stiffness of these joints is such as to enable the skeleton to remain in a set position, but easily moved to a different position (usually by hand) upon application of a set manipulating force.

Located around the skeleton 2 is a body form 5, shown in the middle image, which at least partially defines the shape of the body 1. For example, in FIG. 1 it can be seen that the overall external shape of the body largely corresponds to that of the body form 5. The body form 5 shown includes a number of rigid body sections including a head section 6 with jaw 7, chest section 8, stomach section 9, hands 10, hip section 11, knees 12, feet 13, shoulders 14, elbows 15 and neck 16 with these sections being connected by cables 17. At least some of these rigid sections may be connected to the skeleton 2 for support. They may be formed from hard plastics material for example, metal or the like, or a softer material for example, rubber or the like. It can be seen that here, the body sections correspond substantially to the locations of joints 4 of the skeleton 2. This ensures that when a joint 4 is pivoted, the corresponding rigid body section maintains the shape of the body 1 at that point, i.e. preventing collapse of the body form 5.

At positions located spaced from the rigid body sections, the cables 17 act to define the shape of portions of the body, as can be seen particularly by looking at the arms and legs of the body 1. The mechanical properties of the cables 17 are important. They must be resiliently-deformable (semi-rigid), such that they are capable of substantially supporting themselves, but also capable of flexing without damage. It has been found for example that a suitable cabling material is stringing material for tennis racquets.

Cables 17 are carried by the rigid body sections of the body form 5 such that in use, at least a portion of each cable is free to move relative to the body form in a direction along the length of the cable at that portion. The body sections include cable-receiving apertures in the form of channels formed therein, through which respective cables 17 are threaded. The channels are dimensioned such that relative movement between the cable and its surrounding channel is readily possible in a direction along the length of the cable at the channel, i.e. it is free to move upon application of a manipulating force. In order to permit such movement, each cable is fixedly connected to a body section at one end only of its length, the other end being free. In FIG. 1, it is possible to see free ends of cables 17 extending up through the hip section 11 for example. The other ends of those cables are fixedly connected to foot sections 13. Other cables in the leg may connected the other way round, i.e. fixedly connected to hip section 11, and with a free end extending proximate a foot 13. In other words, a first plurality of cables is fixedly attached proximate a first end of the leg section, and a second plurality of cables is fixedly attached proximate the distal end of the leg section. Intermediate the two ends of the cables 17, and spaced therefrom, the cables loosely extend through knee sections 12. Other cables are similarly connected to hands 10 and extend through elbow sections 15, shoulder sections 14 and chest section 8 for example. Other cables 17 extend between hip section 11, through stomach section 9 and up to chest section 8 for example, to form a torso.

When the body is manipulated, i.e. upon application of a set manipulating force, the body is held in position due to friction of the skeleton joints and the friction between the skeleton and the body sections, as is known in the art. The "free-riding" nature of the cables 17 allows the body form to change shape without creating any rippling or folds. For example, if the body 1 is bent at the knee from a straight leg position to a bent leg position, those cables at the front of the leg will tend to move downward relative to the hip section 11 and knee section 12, while those cables at the back of the leg will tend to move upwardly relative to the hip section 11 and knee section 12. Since the cables 17 are so free to move, they do not bend excessively, such that folding is prevented. The rigidity of the cables 17 is such that whatever the extent of the knee bend, the shape of the leg is still defined by the cables. In particular, the cabling arrangement enables any translational or rotational relative movement between sections of the body form to be performed. Taking the torso of the body 1 as an example, the hip section may be moved translationally from left to right relative to the chest section, from front to back translationally relative to the chest section, rotated relative to the chest section about any axis, whether horizontal, vertical or comprising components of both. It can be seen that in effect, one of the body sections comprises an actuable member capable of movement relative to the other body section. Such movements are enabled due to the cables' ability simply to "follow" the movement due to their freedom to move relative to the body sections. It has furthermore been found that this arrangement produces a very natural-looking movement. In addition, the use of cables 17 means that a large bulk of foam is not necessary to construct the body form 5.

The left-most image of FIG. 1 shows a covering layer 18 of silicone which in use covers the body form 5. As set out above, the silicone covering layer 18 is supported by the cables 17 at locations spaced from the body sections. Although not shown, the cables 17 may run through the covering layer 18 as well as underneath. The cables 17 may run through channels in a covering such as soft foam, or they may ride through a woven mesh type arrangement.

Figure 2:
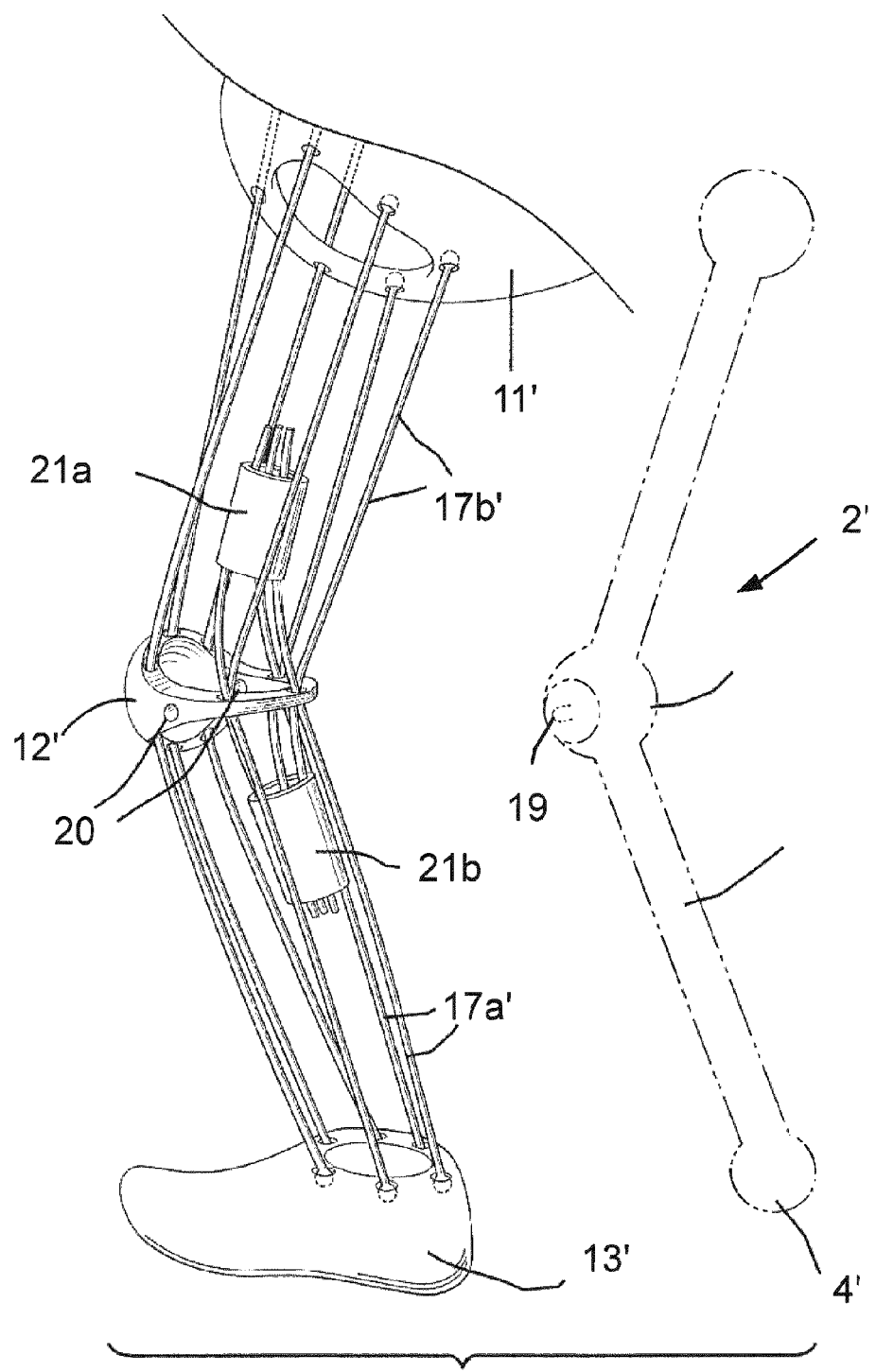
FIG. 2 schematically shows an exploded view of a leg of a body in accordance with a second embodiment of the present invention.

FIG. 2 schematically shows an alternative structure of a leg of a body, in exploded view. The right-most image shows a leg skeleton 2', with lengths 3' and joints 4'. The middle joint corresponds to the knee, and has a protruding nubs 19 (only one visible), for engagement with corresponding holes 20 in rigid knee section 12' of leg form 5' shown in the leftmost image. N.b. here for simplicity the covering layer is not shown. Similarly to the embodiment of FIG. 1, some cables 17a' are fixedly connected to foot 13' and extend up through the knee section 12', while other cables 17b' are fixedly connected to the hip section 11' and extend down through the knee section 12'. In this embodiment, the free ends of cables 17a' and 17b' do not extend throughout the whole length of the leg, but instead are shorter, such that they extend for approximately three-quarters of the leg length. The free ends of cables 17a' are restrained by a sleeve 21a, while the free ends of cables 17b' are restrained by a sleeve 21b. Although not shown in the figure, these sleeves may be fixedly mounted to skeleton 2' for example, or to any knee section 12' or foot 13' or hip section 11', or even to one of the cables being restrained. Each sleeve 21a, 21b acts to restrain the free ends of the cables in a direction generally transverse to the length of said cable at that end, i.e. so that the cables remain free to move in a direction along their length, but not in a direction transverse thereto. This restraint acts to keep the cables stored tidily away within the body for, without interfering with their surroundings. Instead of sleeves, simple rubber bands could be used to tether the free ends of the cables and store them tidily away.

FIGS. 3a to 3c schematically show a relatively simple head section 6', to illustrate how the present invention may be used to provide enhanced mouth operation. FIG. 3a shows an oblique front view of head section 6', with a pivotally attached rigid jaw 7' where the mouth aperture 22 is in a relatively "closed" position. In this embodiment, the mouth aperture is defined by a flexible member which constitutes an actuable member, in this case an inelastic, flexible cord loop 23. A plurality of cables 24 are arranged to co-operate with the loop 23, such that movement of a cable 24 relative to the head section 6' in a direction along the length of the cable 24 causes corresponding movement of the loop 23. As shown, this co-operation is enabled by providing each cable 24 with an eye-loop 25 at one end, through which the loop 23 is threaded. The cables 24 extend generally radially out from the loop 23 in a spaced configuration, such that the ends of the cables with eye-loops 25 are spaced along the loop 23, and each cable 24 lies substantially orthogonal to the loop 23 at the point of engagement. The cables 24 extend into channels 26 formed within the head section, and emerge at the rear of the head section (see FIG. 3c), these ends being free, so as to enable the cables 24 to move in and out of the channels along the direction of the length of the cable. The channels 26 are dimensioned such that relative movement between a cable 24 and its surrounding channel is possible in a direction along the length of the cable at the channel, i.e. it is free to move upon application of a manipulating force. However, frictional force between the channel 26 and cable 24 must be sufficiently high so as to retain the cable 24 in position until so manipulated, as will be described further below. It can be seen that jaw 7' is provided with channels 27, through which two of the cables 24 pass. At the top of the mouth, the cord loop 23 passes through the head section 6' to the rear (as shown in more detail in FIG. 3c) via two channels 29 in the head section 6'. FIG. 3a shows that the positioning of the cables 24 relative to the head section 6' can determine the shape of the mouth aperture, and hence give expression to the character. In this figure, the character appears to be smiling.

In FIG. 3b, which shows a similar view to FIG. 3a, the mouth aperture is widened to produce a gaping expression. The perimeter of the mouth is increased, which is possible to the use of the loosely threaded cord loop 23. The jaw 7' has also been moved downwards relative to the head section 6'.

FIG. 3c shows the head of FIGS. 3a and 3b from an oblique rear perspective. It can be seen that the head section 6' is hollow, with an opening 30 at the back of the head. Channels 26 open around the perimeter of the opening 30, with cables 24 emerging therefrom. The required friction between the cables 24 and head section 6' is provided by means of a damping mechanism 28, which as shown comprises an elastic band wrapped around each of the cables 24 and held in place by a substantially circular plate 31. From this figure, it is apparent that the shape of the mouth aperture may be adjusted either by direct manipulation of the aperture, or by manipulating the free ends of the cables 24. In the latter case, this manipulation may be done manually, or by using an actuator (not shown), which may permit accurately reproducible movements to be made. Channels 29 open above the opening 30, with the upper end of cord loop 23 looped therethrough. This means that loop 23 is arranged substantially in a "figure of 8" configuration, with the lower portion of the "8" defining the mouth aperture, and the upper portion of the "8" extending through the head section 6' and emerging at its rear. If this rear portion of loop 23 is pulled, the cord loop 23 gathers through eye-loops 25, in a similar manner to the string of a purse, to reduce any slackness of cord loop 23 at the mouth aperture.

With this arrangement, the mouth aperture, defined by loop 23, may be manipulated through a dynamic wide range, enabling a huge range of expressions to be created.

A relatively simple version of a similar mouth controller is shown in FIGS. 4a-c. Here, rather than showing an entire head section, a "mouth ball" 32 is shown, which is a simple, hollow, part spheroid. In use, this may be inserted into the hollow interior of a head section for example. Other components are similar to those of FIG. 3, and like reference numerals have been retained, with an exception that here loop cord 23 is elastic, and is not formed in a "figure of 8" arrangement, but instead the entirety of the loop defines the mouth aperture. FIG. 4a shows in oblique view the rear of the mouth ball 32, and the free ends of cables 24 extending therefrom. As shown, the cables protrude by differing amounts, which, as shown in FIG. 4b, an oblique front view of the mouth ball 32, creates a non-circular mouth aperture defined by an elastic loop cord 23. FIG. 4c is an oblique vie of the mouth ball 32 in a cut-away form, so that the interior of two channels 26 can be seen, with respective cables 24 located inside.

Figure 5:
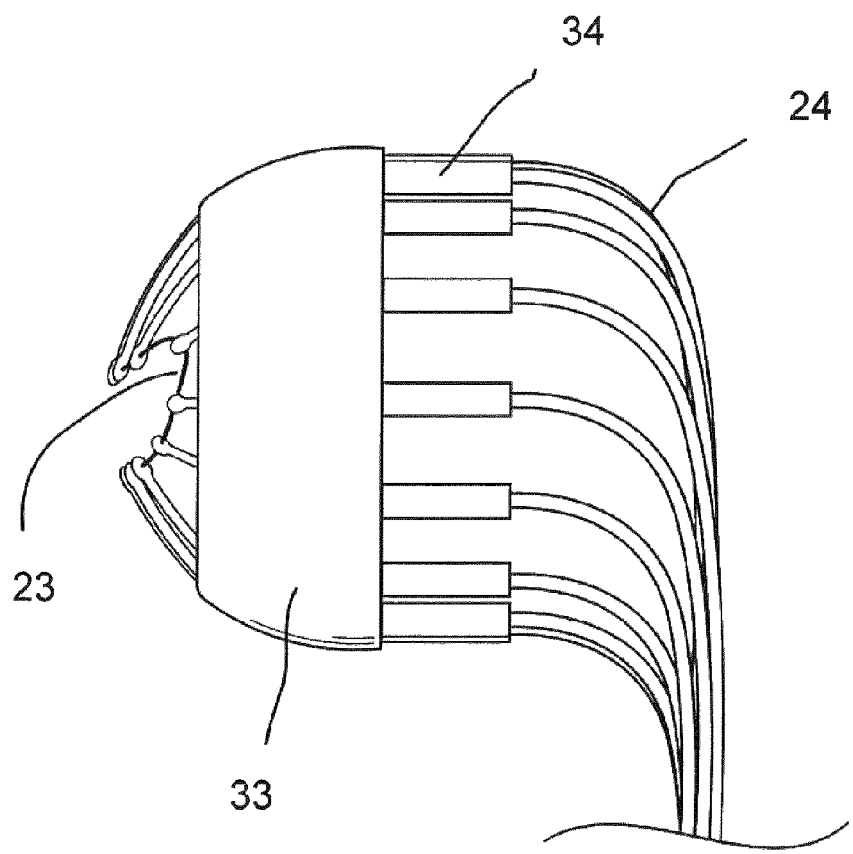
FIG. 5 schematically shows an alternative form of mouth controller in accordance with the present invention.

FIG. 5 schematically shows an alternative form of mouth controller. Here, an alternative form of mouth ball 33 is shown, having cable guides 34 located at the rear. Cables 24 are longer than shown in FIGS. 3 and 4, and extend out from cable guides 34 and are extend downwards towards the neck of the character, the free ends not being visible. This type of arrangement is particularly useful for applications where the ends of the cables 24 are connected to an actuator (not shown) to provide controllable and reproducible cable, and hence mouth, movements. Another use for this type of arrangement may be where the character head is small for example.

FIGS. 6a-f schematically show alternative forms of mouth aperture arrangement, which serve to demonstrate the flexibility of the present invention. In each case, a plurality of cables 24 are shown extending substantially radially away from the mouth aperture and into channels 26.

Figure 6A:
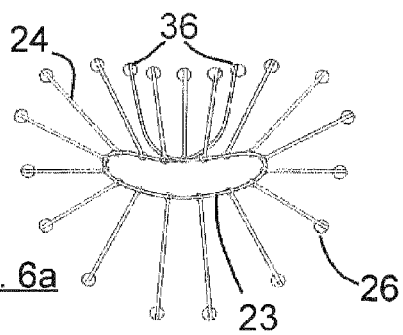
FIGS. 6a-f schematically show alternative forms of mouth aperture arrangement in accordance with the present invention.

FIG. 6a, an inelastic "figure of 8" cord loop 23 is used, where the lower portion defines the mouth aperture, and the upper portion extends through the head section via channels 36 to form a gathering loop at the rear, similar to the arrangement of FIG. 3.

Figure 6B:
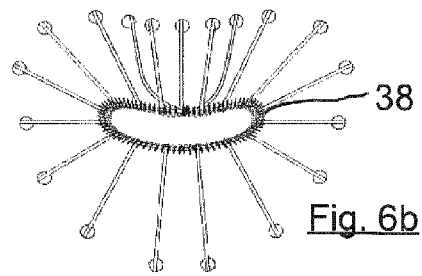

FIG. 6b shows an arrangement similar to that of FIG. 6a, except that here the inelastic cord loop 23 is provided with an elastic guide in the form of a spring 38 around the lower portion of the "figure of 8", i.e. to surround the mouth aperture only. This will affect the properties of the mouth, which may be required for certain characters.

Figure 6C:
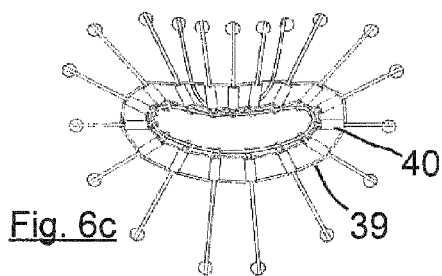

FIG. 6c shows a relatively complicated arrangement, based on that of FIG. 6a, in which an outer loop 39 is provided radially outwardly of the mouth aperture. Spacers 40 are threaded around the cables 24 to maintain a set distance between loop 39 and the mouth aperture defined by cord loop 23.

Figure 6D:
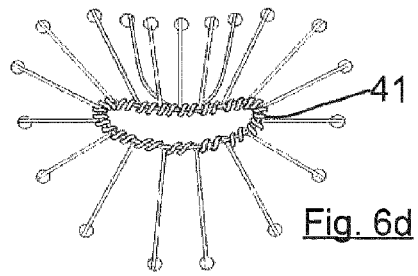

FIG. 6d shows an arrangement similar to that of FIG. 6a, where a further length of inelastic cable 41 is coiled around the mouth aperture cord, which acts to adjust the properties and appearance of the mouth.

Figure 6E:
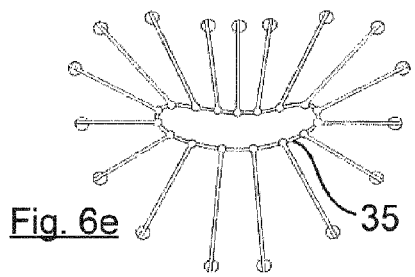

In FIG. 6e, the mouth aperture is defined by a simple loop of elastic cord 35, and the connection between the cables 24 and the elastic cord loop 35 is fixed. Due to the elasticity of cord 35, no gathering is required. This arrangement is similar to that shown in FIG. 4.

Figure 6F:
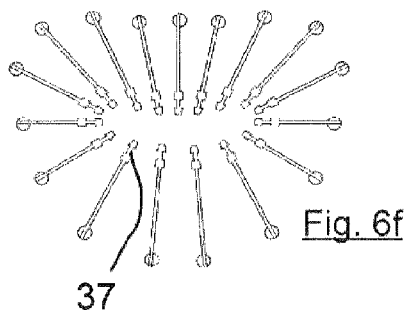

In FIG. 6f, the mouth aperture is defined by a hole formed in the covering layer (not shown). In other words, the cables 24 are anchored directly to the covering layer by means of anchors 37. The covering layer will generally be formed by silicone, an elastic material, and so this type of arrangement will function similarly to that of FIGS. 4 and 6e. However, the covering layer may also be formed of a soft foam or woven mesh, for example.

Figure 6G:
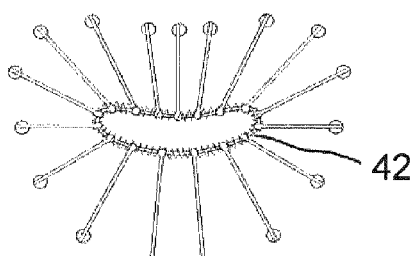

FIG. 6g shows an arrangement similar to that of FIG. 6e, but further including an elastic guide in the form of a spring 42 coiled around the loop 35. This again affects the properties and appearance of the mouth.

Figure 7A:
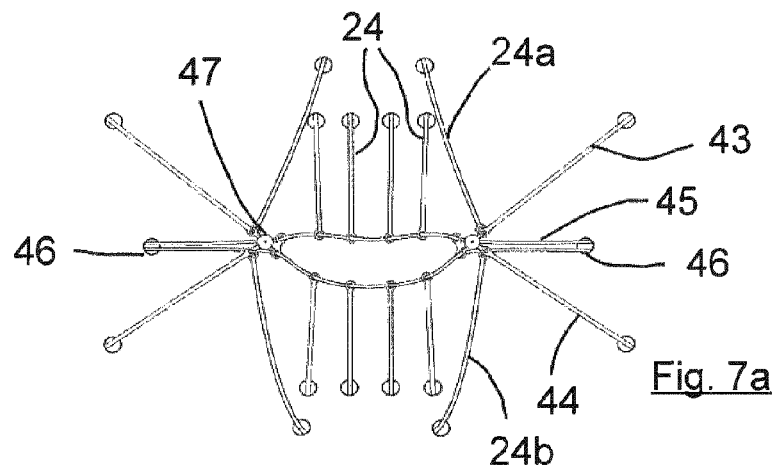
FIGS. 7a-c schematically show examples of mouth aperture arrangements using a "wish-bone" configuration in accordance with the present invention.
Figure 7B:
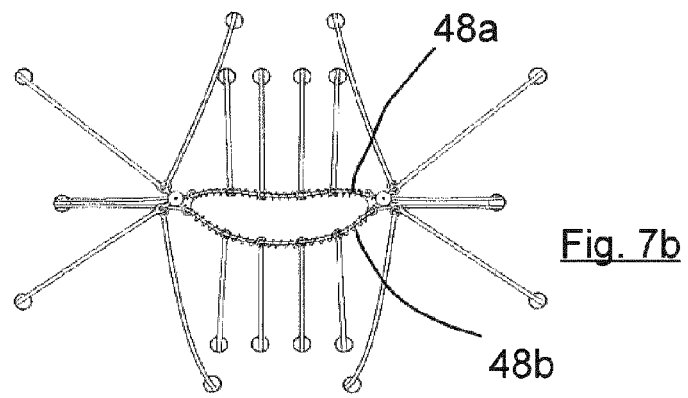
Figure 7C:
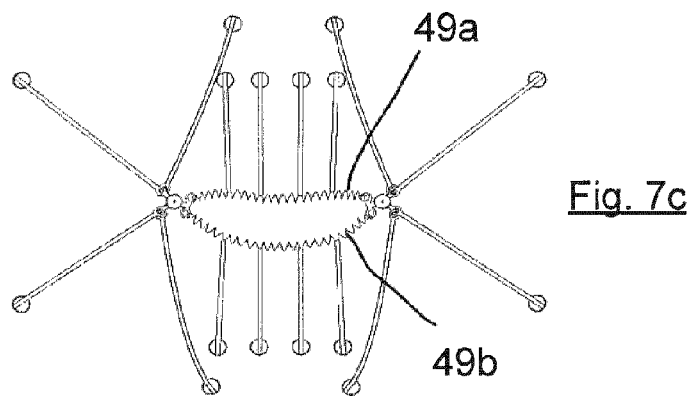

FIGS. 7a-c schematically show examples of mouth aperture arrangements using a "wish-bone" configuration, in which the corners of the mouth may be controlled to enable a pivoting movement, i.e. to turn the corners of the mouth up or down, adjusting the position of the aperture with respect to the body form. This pivoting movement is enabled by a control means which comprises a link 43 which engages with one of said cables 24a and lies in a non-parallel direction to that cable, such that movement of the link 43 along its axis causes corresponding movement of the cable 24a in that direction. A further link 44 is provided which engages with a cable 24b, cables 24a and 24b being connected, the arrangement being such that differential movement of the first and second links causes rotation of the flexible member. Links 43, 44 may be generally similar to cables 24, and free to move in a similar manner.

In FIG. 7a, the flexible member comprise a loop of inelastic cord 45, which is relatively long, such that the mouth aperture is only defined by a portion of the cord. The cord extends past the corners of the mouth, into a channel 46 at each end (as shown in more detail in FIG. 8b). Cord 45 is loosely carried by threading through eye-loops provided at the ends of cables 24 proximate the mouth aperture. A rigid swivel plate 47 is provided at each corner of the mouth, engaging with the top and bottom lengths of cord 45, link 43 and link 44, and defining the corners of the mouth. Differential movement of links 43 and 44—or indeed cables 24a, 24b—causes the swivel plate 47 to rotate relative to the head section. Pulling on the ends of links 43, 44 causes the swivel plates 47, and hence the corners of the mouth, to draw apart. The height of the mouth corners can be adjusted by suitable manipulation of cables 24a, 24b or 43, 44. Pulling on the lateral ends of cord 45 causes the cord to "gather", reducing any slackness proximate the mouth aperture.

FIG. 7b shows an arrangement similar to that of FIG. 7a, but here elastic guides in the form of a springs 48a, 48b are respectively provided around the upper and lower extents of loop 45 which define the mouth aperture.

FIG. 7c shows an example where instead of using a loop 45, upper and lower elastic members in the form of springs 49a, 49b is used to define the mouth aperture.

In all these examples, since the swivel plate 47 is free to move relative to the head section, in use the mouth components tend to "find their own place", i.e. they will tend to settle in a position where the forces acting on the components are balanced. It has been found that this provides a naturalistic mouth mechanism for a figure.

Figure 8A:
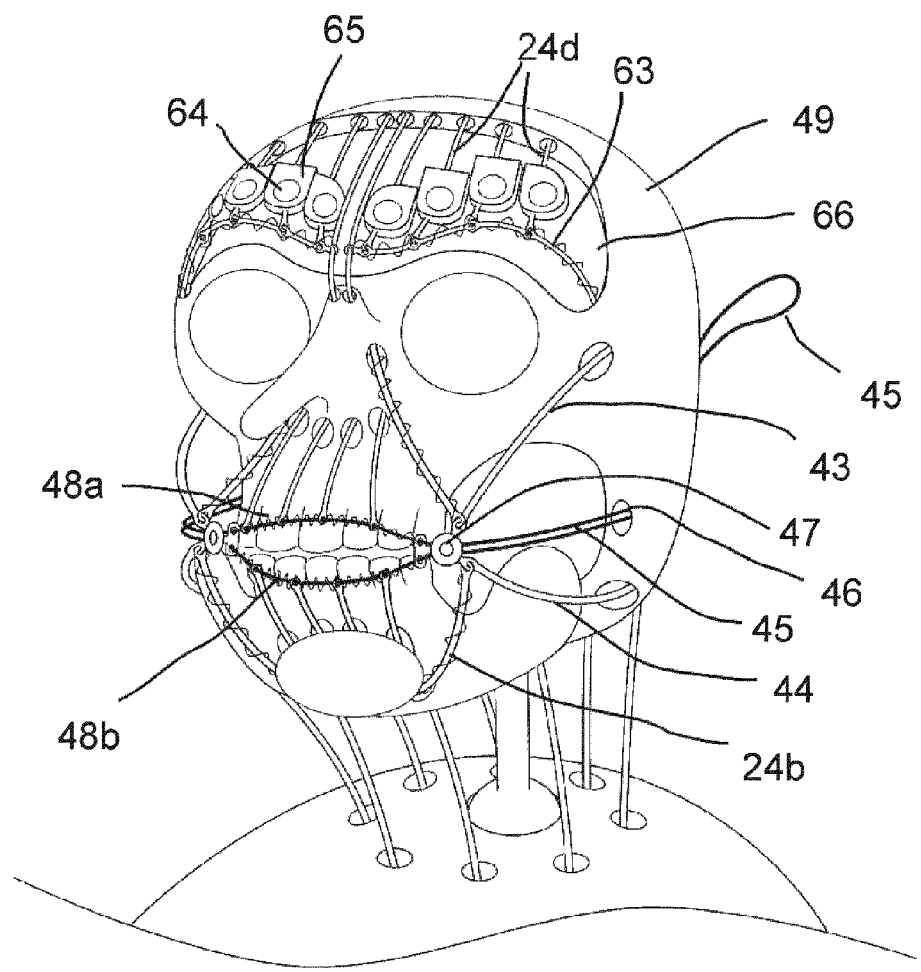
FIG. 8a, b schematically show front and rear views of an alternative head section in accordance with the present invention.

FIG. 8a, b respectively schematically show oblique front and rear views of a head section 49 using such a "wish-bone" control means, similar to that of FIG. 7b. As shown, cables 24a, 24b are also provided with elastic guides in the form of springs. FIG. 8b shows most clearly that links 43, 44 extend through channels in the head section 49 and emerge with free ends at the rear, enabling their manipulation. With this arrangement, similarly to that of FIG. 3, the loop 45 may be pulled at the rear of the head, which acts to "gather" the cord to reduce any slackness at the mouth region. The required friction between cables 24, 24a, 24b and head section 49 is provided by means of a damping mechanism 63, which as shown comprises an elastic band wrapped around each of the cables 24 and held in place by folded over tabs 64 of the head section.

FIG. 9 schematically shows the an oblique view of the rear of an alternative head section 50. This has many similarities to that of FIG. 8, but here links 43, 44 are manipulable using an alternative arrangement. Each of links 43, 44 is connected to a carrier 51, threadedly mounted onto a screw thread 52, and housed within a recess 53 formed in the head section 50. The screw thread 52 is provided with a handle 54, enabling ready rotation of the screw thread 52. Such rotation causes the carrier to move axially within the recess 53, in turn moving the end of the respective link 43, 44 toward or away from the mouth.

Figure 10A:
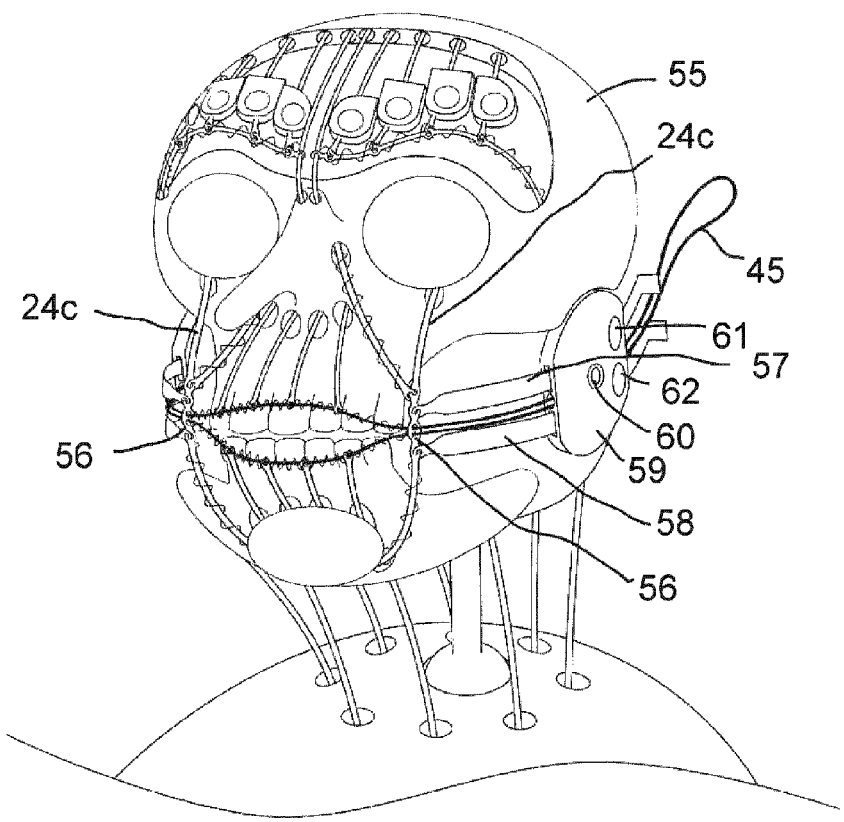
FIGS. 10a, b schematically show front and rear views of a yet further head section in accordance with the present invention.

FIG. 10a, b respectively schematically show front and rear oblique views of a further head section 55, having an alternative control means for the mouth aperture. As with FIG. 8, the mouth aperture is defined by a portion of a flexible member comprising a cord loop 45. The corners of the mouth are defined by respective cables 24c, which as shown extend from channels proximate the head section's eye sockets to the chin. The cables 24c include guide apertures 56 which receive the cord loop 45 and define the mouth corners. Attached to each cable 24c are upper and lower link arms 57 and 58, which are aligned substantially horizontally, i.e. they run generally between the mouth toward the ear position and towards the rear of the head. The link arms 57, 58 may advantageously comprise strips of ferrous metal, as will be described below. The link arms are attached to the head section 55 via a pivot plate 59, attached to the head section via pivot 60, proximate the ear. The link arms 57, 58 extend through guide channels in the plate 59. Apertures in the plate 59 receive respective magnets 61, 62, which align with respective link arms 57, 58. Since link arms are made from a ferrous metal, the magnets 61, 62 are attracted to the arms, acting to retain the arms in a desired position relative to the plate 59. Vertical movement of the mouth corners may be effected either by corresponding vertical movement of cables 24c, or more simply by pivoting pivot plate 59 up or down. Differential movement of the link arms 57, 58 causes rotation of the mouth corners. Movement of the link arms is readily controlled by manipulation of the free ends of the link arms at the rear of the head section 55. Pivot plate 59 also receives loop 45 through a central channel, so that it may pass to the rear of the head, to form a gathering loop. At the rear of head section 55, the required friction between the cables 24 and head section 55 is provided by means of a damping mechanism 65, which as shown comprises upper and lower elastic bands wrapped around each of the cables 24 and held in place by folded over tabs 66 of the head section 55.

Turning back to FIG. 8a, also shown is an arrangement to enable control of a figure's eyebrows. The eyebrow line is defined by a flexible member, in this case an inelastic, flexible cord 63, provided with an elastic guide in the form of a spring. A plurality of cables 24d are arranged to co-operate with the cord 63, such that movement of a cable 24d relative to the head section 49 in a direction along the length of the cable 24d causes corresponding movement of the cord 63. As shown, this co-operation is enabled by fixedly attaching each cable 24d to the cord 63 at spaced apart points along the length of cord 63, with each cable 24d lying substantially orthogonal to the cord 63 at the point of engagement. Each cable 24d carries a damper 65 affixed thereto, to control rotational movement of the cable relative to the head section 49. Each damper 65 comprises a magnet 64 surrounded by a non-magnetic covering, for example made from a plastics material to prevent substantial magnetic interaction between magnets 64 of respective dampers 65. The magnets 64 are attracted to a ferrous metal region 66 provided on the head section 49, approximately overlying the forehead region. With this arrangement, the eyebrow line, defined by cord 63, may be manipulated through a dynamic wide range, while maintaining a natural shape.

Figure 10B:
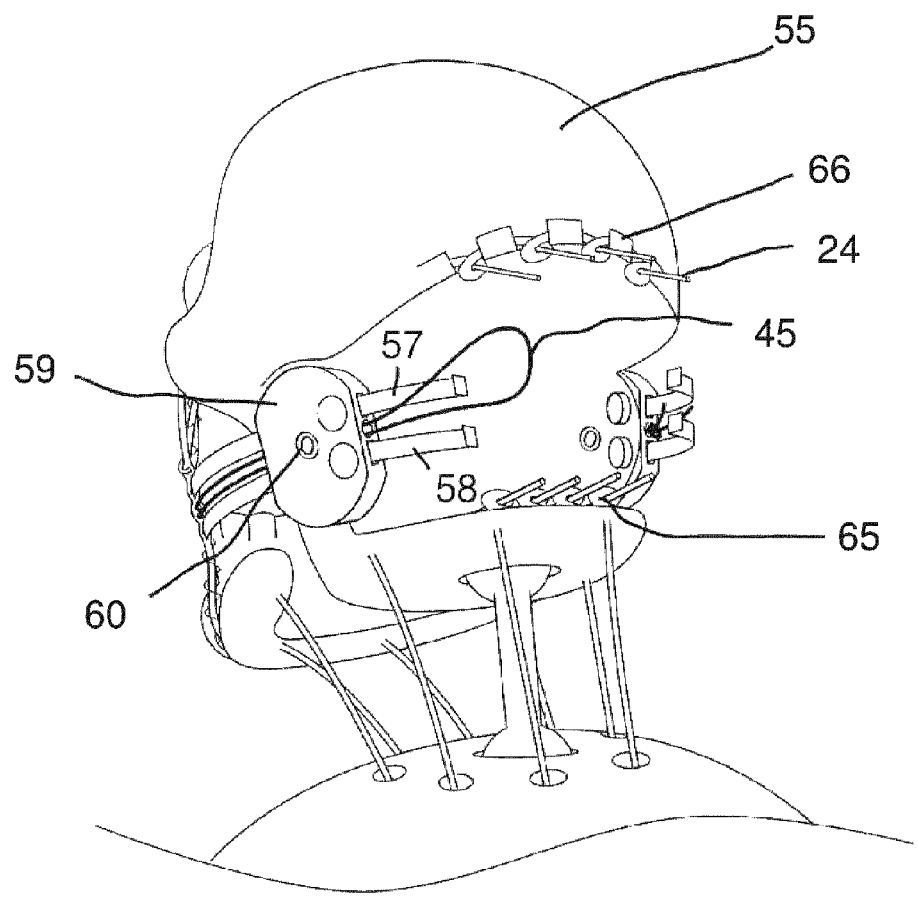
Figure 11A:
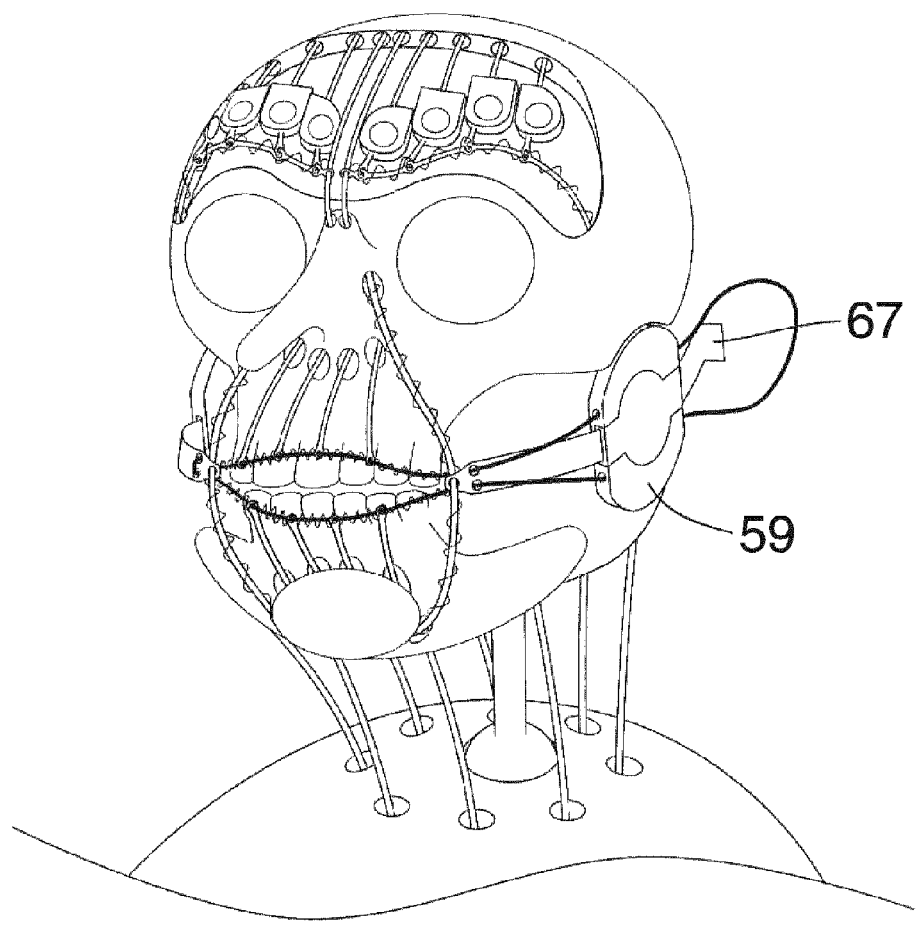
FIGS. 11a, b schematically show front and rear views of a yet further head section in accordance with the present invention.
Figure 11B:
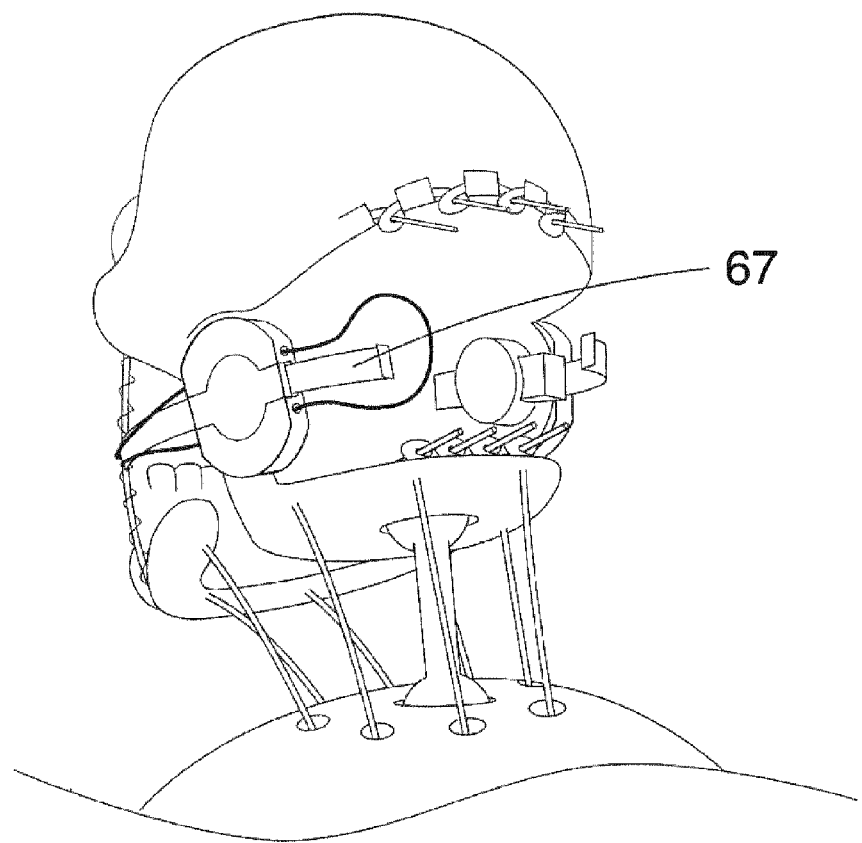

FIGS. 11a-b show a similar arrangement to that shown in FIGS. 10a-b. However, in this embodiment the two link arms 57, 58 have been replaced with a single link arm 67, and the damping action previously provided by magnetic dampers 61, 62 is provided by the link arm 67, engaging with a wedge (not shown) and pivot plate 59.

Figure 12A:
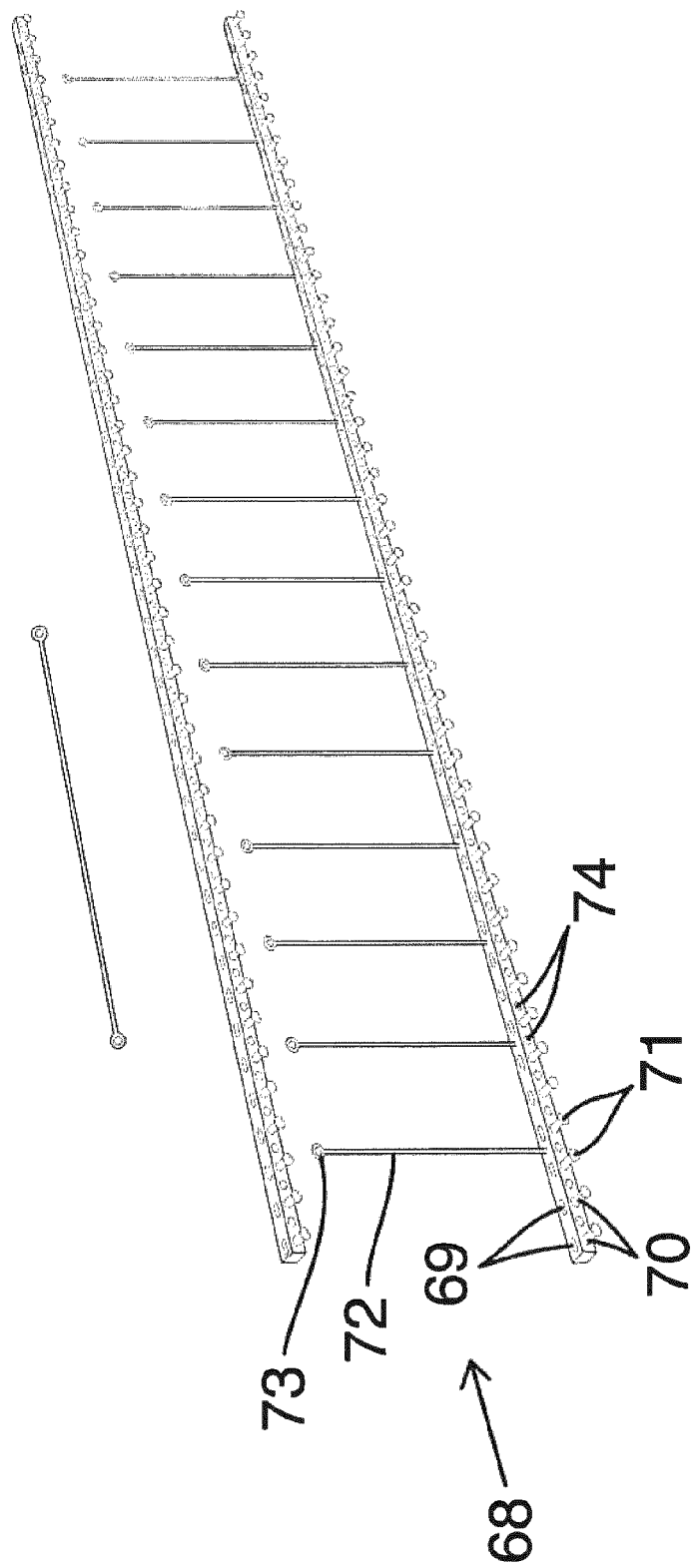
FIGS. 12a-e show an embodiment of the invention comprising modular strips, and various ways of attaching the strips together.

FIG. 12a shows a kit of parts in accordance with one embodiment of the present invention. The kit comprises: at least one resiliently deformable elongate member, said member comprising at least one aperture and at least one protrusion extending from a surface of said member, and a plurality of resiliently deformable cables with means for attachment to said protrusions, said at least one aperture being dimensioned so as to retain a length of one of said plurality of cables within it in use while permitting relative movement of said cable relative to the aperture in a direction along the length of the cable upon application of a set manipulating force.

Optionally, at least some of the plurality of resiliently deformable cables may be permanently attached to a second resiliently deformable elongate member.

The kit may further comprise resiliently deformable cables with attachment means at both ends.

The apertures may be formed in only one surface, or in more than one surface (e.g. orthogonal surfaces), of the resiliently deformable elongate member.

Figures 12B, 12C, 12D:
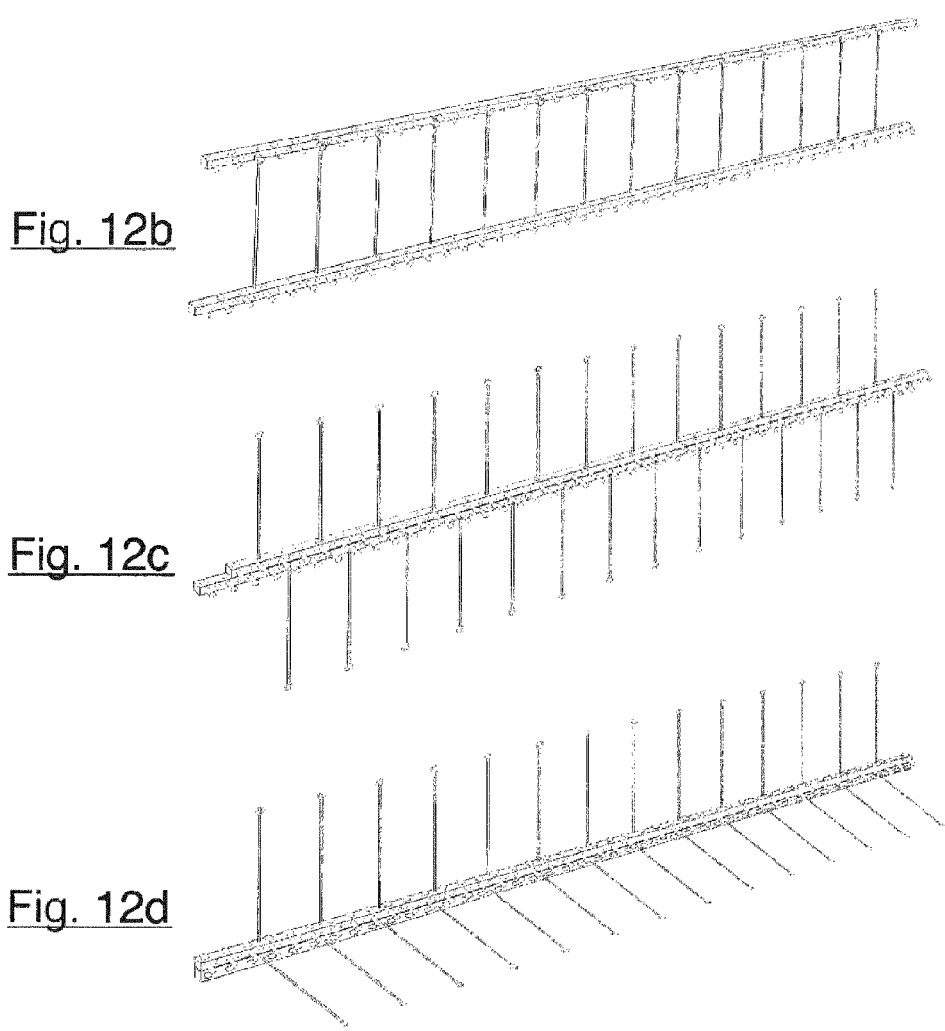
Figure 12E:
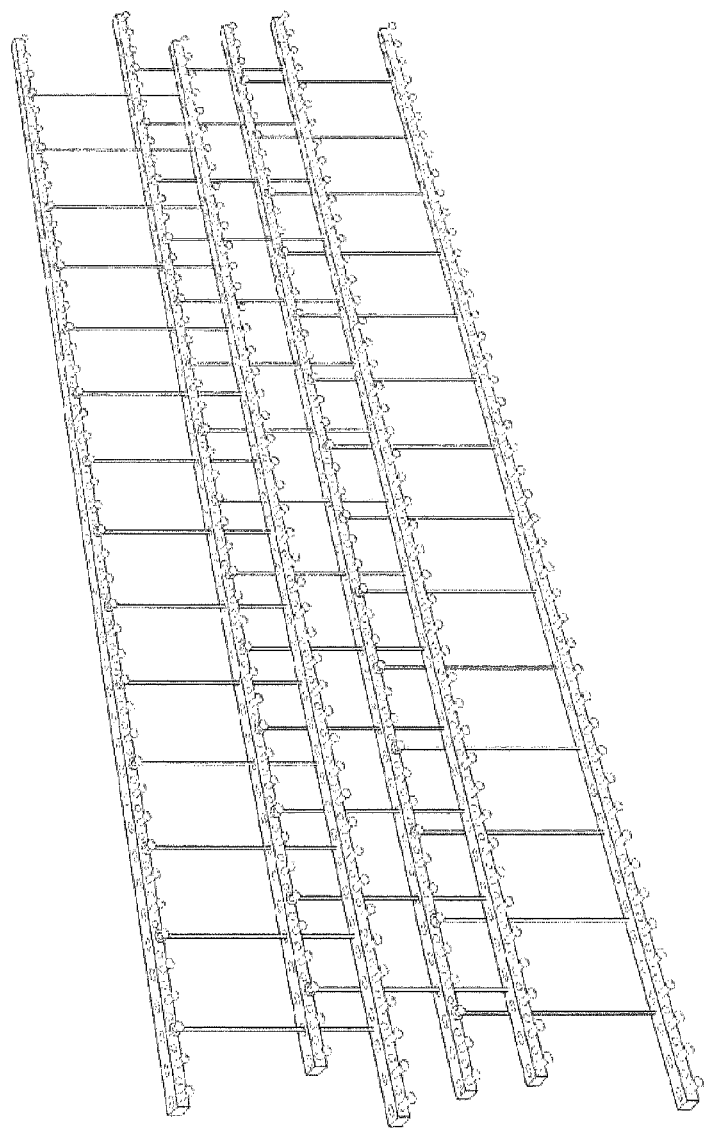

In this example, the resiliently deformable elongate member comprises a modular strip 68. One or more of these strips in combination with a plurality of resiliently deformable cables may form a kit of parts in accordance with the present invention. The strip has apertures 69 running through one surface and protrusions 70 extending from a perpendicular surface, the protrusions 70 having retaining means 71 at their respective distal ends. Said perpendicular surface also has through-holes 74 running through it, between the protrusions 70. Intermediate the apertures 69 are cables 72 having eyelets 73 at their respective distal ends. As shown in FIGS. 12b-e, multiples of these strips may be interconnected in various ways, as the protrusions 70 may be attached to the eyelets 73 of the cables 72 (as shown in FIGS. 12b and 12e), the protrusions 70 may be attached to the apertures 69 (as shown in FIG. 12d), and the cables 72 may run through the apertures 69 (as shown in FIGS. 12c and 12e).

Figure 13C:
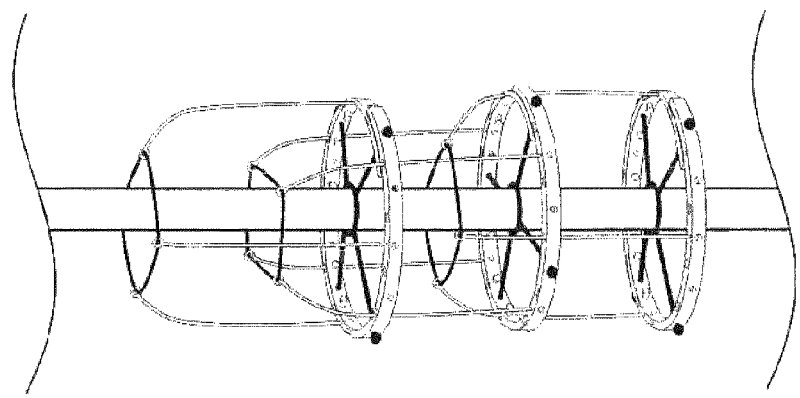
FIGS. 13a-c show various embodiments of a "lampshade" configuration in accordance with the present invention.
Figure 13B:
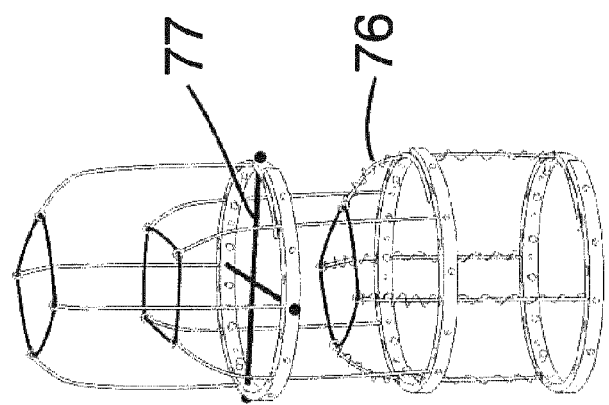
Figure 13A:
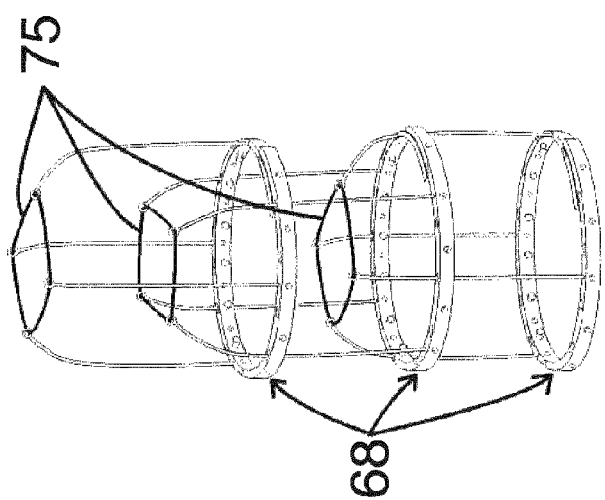

FIGS. 13a-c shows a 'lampshade' arrangement using the modular strips of FIG. 12. In this arrangement each strip 68 is folded around until its protrusions 70 engage with its own through-holes 74. The cables 72 of each strip extend through the apertures of an adjacent strip, and the ends of the cables 72 are gathered by respective elastic cords 75 which run through the eyelets 73 of the cables 72. FIG. 13b shows an embodiment in which some of the cables 72 are surrounded by a spring 76 to provide a resistive force which returns the cable to a predetermined shape. FIG. 13b also shows elastic crossbars 77 engaged with the through-holes 74 of a strip to maintain a circular cross section. If an oval cross section was required, only one cross-bar could be used. FIG. 13c shows how the lampshade arrangement could be attached to a skeleton using the elastic cross-bars 77.

Figure 14:
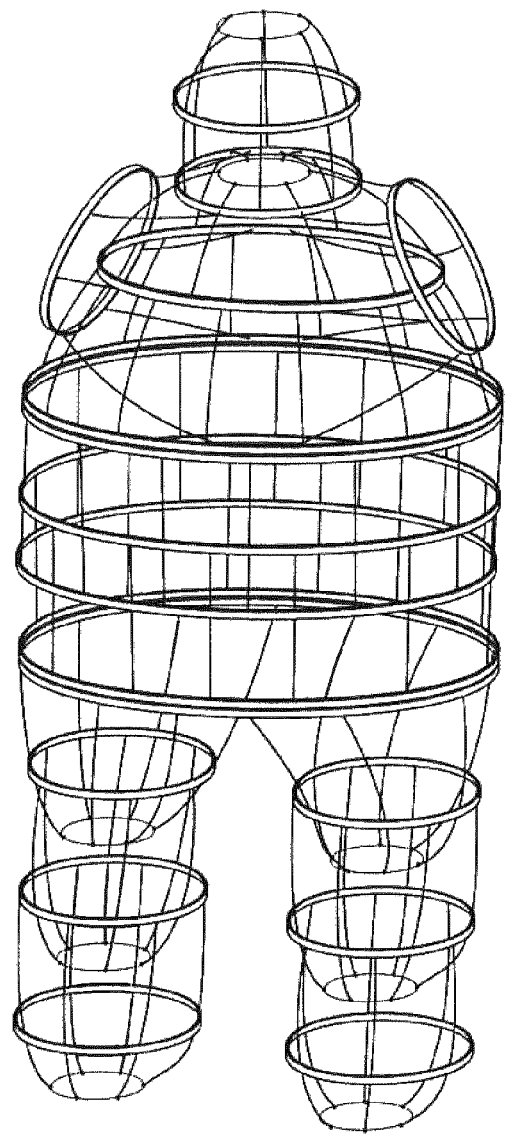
FIG. 14 shows an embodiment of a "wicker man" configuration in accordance with the present invention.

FIG. 14 shows a "wicker man" arrangement which comprises many of the lampshade arrangements of FIGS. 13a-c connected together.

Figure 15:
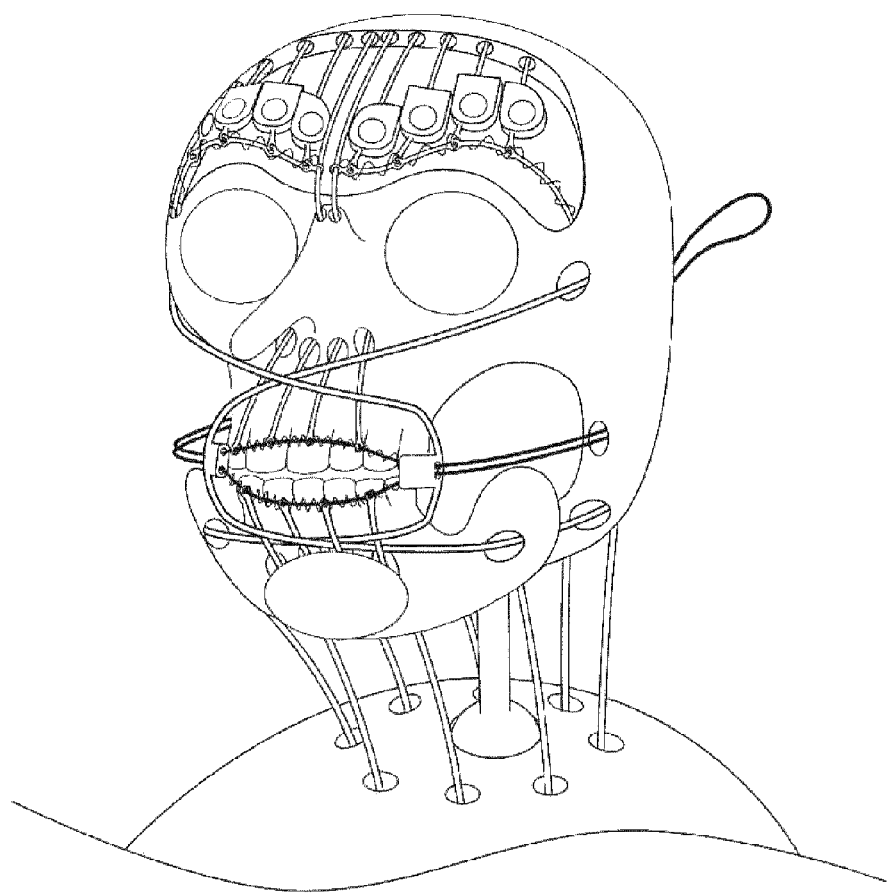
FIG. 15 schematically shows a front view of a yet further head section in accordance with the present invention.

FIG. 15 shows an animation head with a "wish bone" mouth configuration. This is similar to that shown in FIGS. 8a-b, but the cables which control the mouth corners have effectively been reversed, so that they cross over to control the mouth corner on the distal side from the cable aperture. Although the embodiment shown in FIG. 15 does not use a pivot point, one may be included if required.

Figure 16:
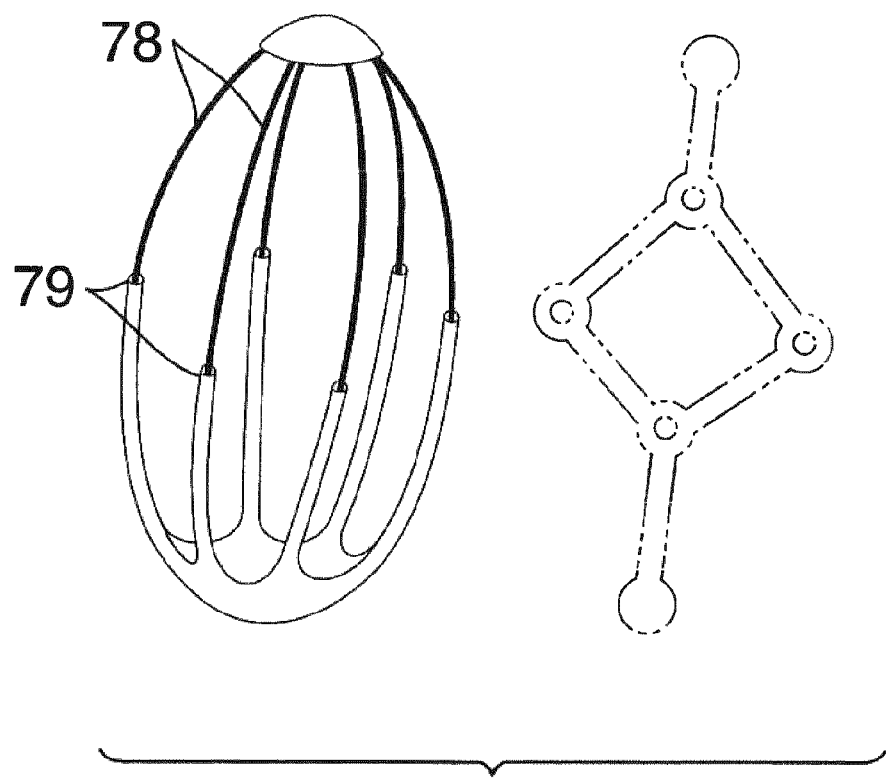
FIG. 16 shows a structure in accordance with the present invention which allows squash and stretch movement.

FIG. 16 shows a structure which may exhibit squash and stretch movement. The cables 78 move in apertures 79 to expand or contract the volume of the structure.

Figure 17B:
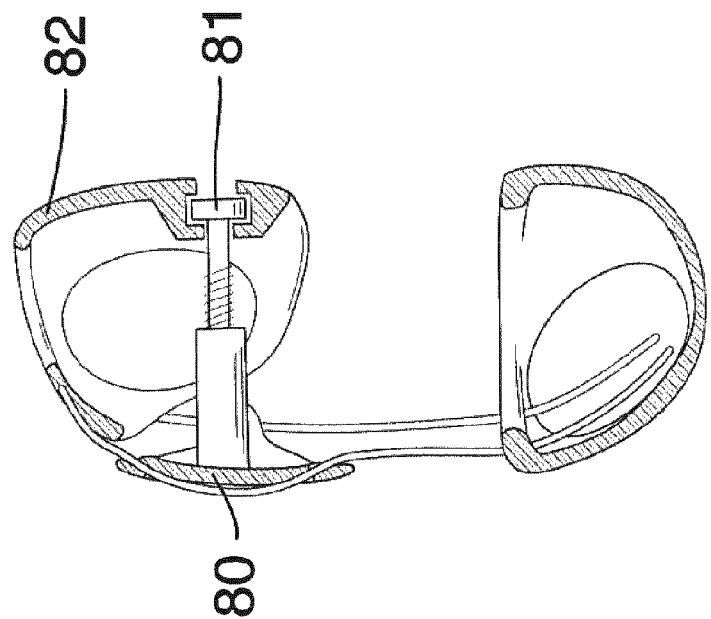
FIGS. 17a-c show a breathing mechanism in accordance with the present invention.
Figure 17A:
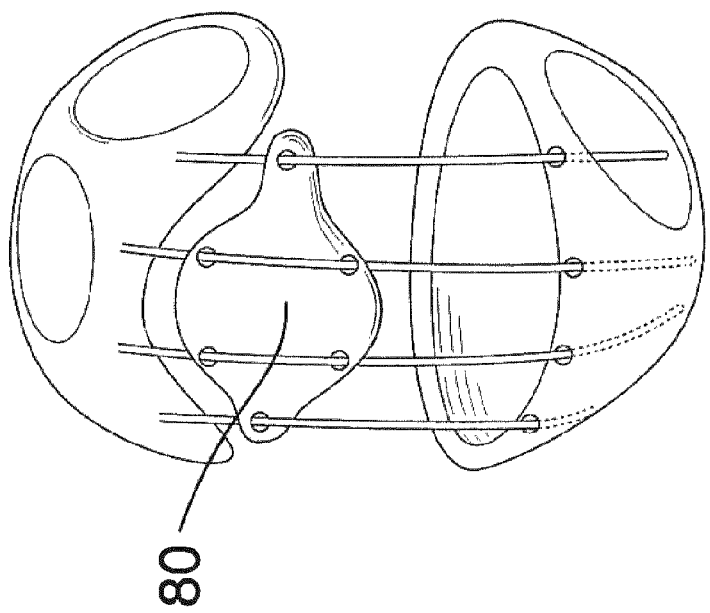
Figure 17C:
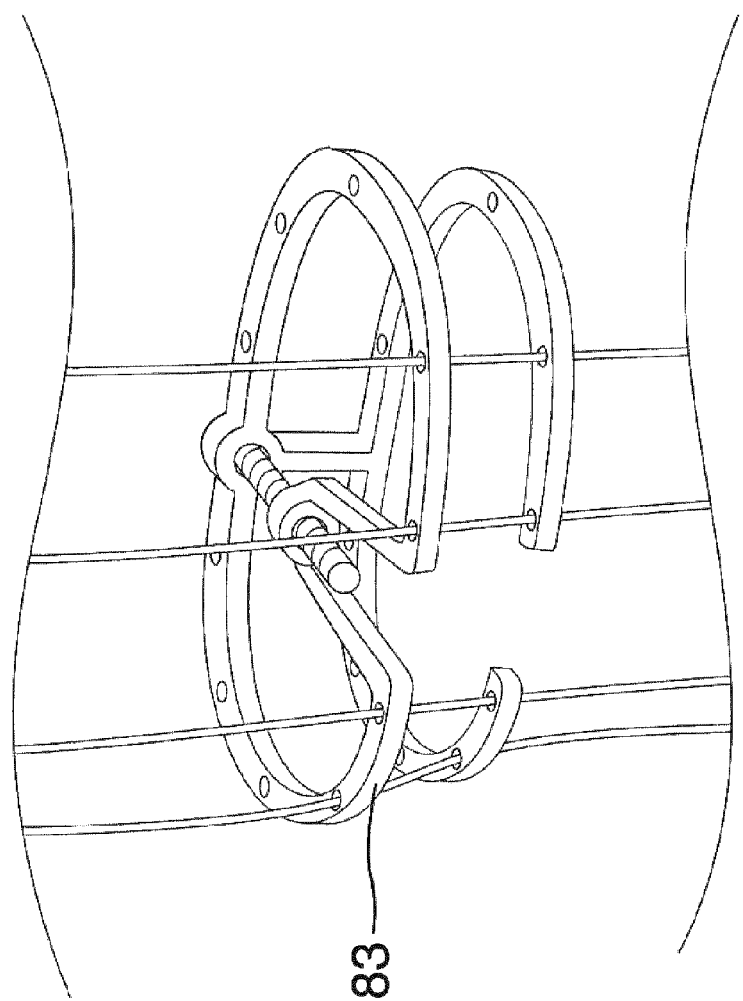

FIG. 17 a-c show a breathing mechanism in accordance with the present invention. The cable and aperture arrangement allows a chest plate 80 to be moved inwardly or outwardly by a screw 81, relative to a shoulder portion 82. A hip section is also shown. FIG. 17c shows an embodiment with a ribcage 83 instead of a chest plate, however the principle is generally the same.

Figure 18A:
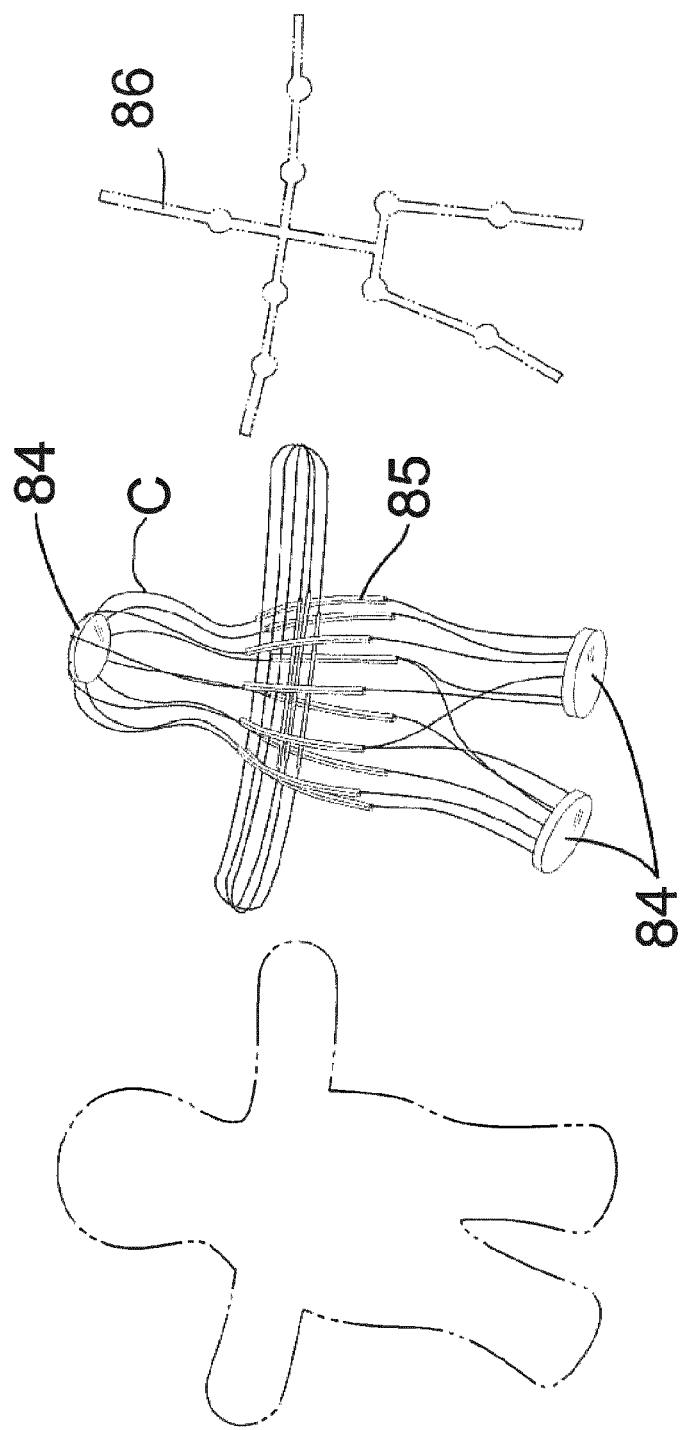
FIGS. 18a-b shows a soft tube body in accordance with the present invention.
Figure 18B:
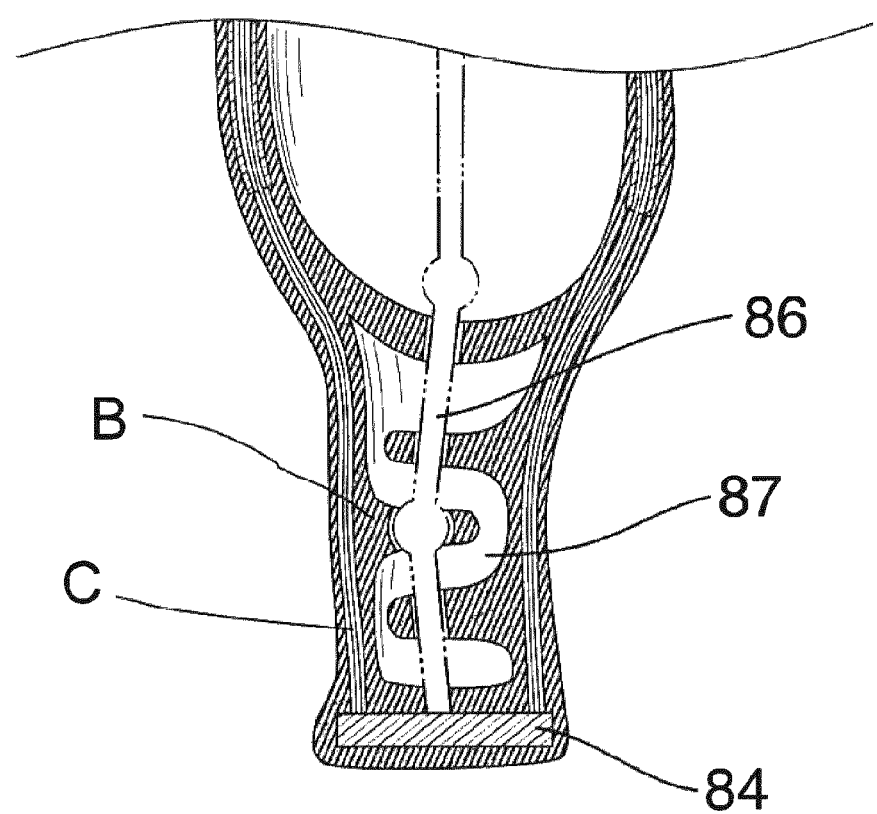

FIGS. 18a and 18b show a soft tube body in accordance with the present invention. This embodiment doesn't have rigid hip, chest, or knee parts as used in previous embodiments. The job of these rigid parts is now done by a carcass B (see FIG. 18b) made of e.g soft foam, or the like. An end of each cable C is attached to a soft disc 84 which forms the head and foot of the body, and the cables run through channels formed in the foam of the body. The distal ends of leg cables and the head cables run into torso tubes 85. The tubes 85 provide a smooth bendable sheath, which prevent the cable ends from puncturing or snagging on the foam of the body, as well as helping to define the shape of the torso. FIG. 18b shows a cross sectional view of a leg, where it can be seen that the skeleton 86 of the body is also attached to the disc 84. Voids 87 run inside the leg to allow the carcass material of the covering to fold into itself when bending to avoid a rippling effect on the outer surface.

FIG. 19 shows a horse leg arrangement in accordance with the present invention. In this embodiment foam shapes 88 are used to simulate the appearance of muscles. The shapes have apertures through which the cables run. In movement the cables and foam shapes interact; flexing, sliding, stretching and compressing. At times a foam shape could merely be surrounded by the cables (i.e. without apertures), keeping them apart and being compressed and twisted by the cables in movement.

Figure 20A:
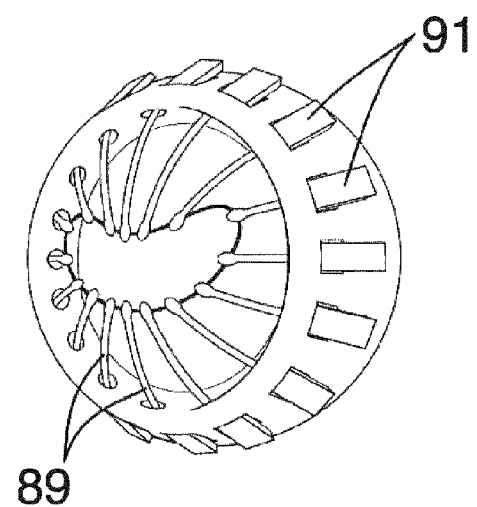
FIGS. 20a-b show a mouth ball configuration in accordance with the present invention.
Figure 20B:
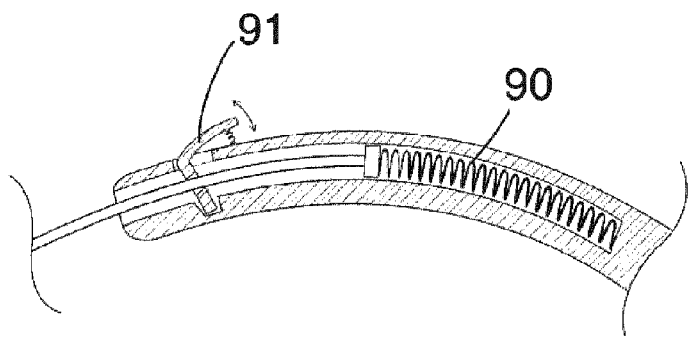

FIG. 20 a-b show a spring loaded mouth ball arrangement in accordance with the present invention. The cables 89 are resiliently biased by biasing means 90 in order to urge the cables to extend in an axial direction. Axial movement of the cables 89 is controlled by buttons 91 which may be operated from the front of the mouth. Said buttons 91 may lie just below the surface of the skin. Said biasing means may comprise e.g. coil springs or flat springs.

The above-described embodiments are exemplary only, and other possibilities and alternatives within the scope of the invention will be apparent to those skilled in the art. For example, such a body could include one or more cables which run substantially the length of the body, and which are fixed at an intermediate location, e.g. near the waist, but are free-riding at both ends.

As an alternative, the cables may be connected at the ends, to form a loop.

Although the eyebrow line is shown as being defined by an inelastic cord, the line may be defined by a free-riding cable, or could be elastic, for example springs or individual sections of elastic, or could include spacers for example.

Although the invention has been described with particular reference to a stop-motion animation figure, there are many different applications for such an inventive structure, which may take many forms. It is possible to imagine for example a spheroidal shape formed by two body sections, which are connected by a plurality of free-riding cable loops. In this case, the two body sections may be moved relative to each other in any direction, including twisting, to produce a desired shape. These body sections may be rigid, or they may be formed of softer materials such as rubber.

What is claimed is:

1. A structure having a shape, the structure comprising:
an elongate, resiliently deformable cable,
a body section comprising a cable-receiving aperture, said aperture being dimensioned so as to retain a length of said cable within said aperture in use while permitting relative movement of said cable relative to the aperture in a direction along the length of the cable upon application of a set manipulating force, and
retaining means for retaining the cable at a set position relative to the body section absent application of said force,
wherein the cable at least partially defines the shape of the structure, and said shape may be changed by application of said manipulating force thus causing relative movement between the cable and the body section in a direction along the length of the cable.

2. The structure according to claim 1, further comprising an actuable member which engages with said cable, such that movement of said cable relative to the body section causes corresponding movement of the actuable member relative to the body section.

3. The structure according to claim 2, wherein the retaining means comprises a skeleton connected to the body section and to the actuable member, to control the relative positions of the body section and actuable member.

4. The structure according to claim 1, wherein the retaining means applies a frictional force between the cable and the body section to prevent relative movement therebetween.

5. The structure according to claim 1, comprising:
a plurality of elongate, resiliently-deformable cables, and the body section comprises a plurality of cable-receiving apertures, each said aperture being dimensioned so as to retain a length of a respective cable within said aperture in use while permitting relative movement of said cable relative to the respective aperture in a direction along the length of said cable upon application of a respective set manipulating force, and
retaining means for retaining each cable at a set position relative to the body section absent application of said force,
wherein the cables at least partially define the shape of the structure, and said shape may be changed by application of a said manipulating force.

6. The structure according to claim 1, wherein said plurality of cables define the shape of at least a section of the body.

7. The structure according to claim 1, wherein at least one cable is at least partially guided by a further body section at a point along a length of the at least one cable.

8. The structure according to claim 1, further comprising an actuable member which engages with said cable, such that movement of said cable relative to the body section causes corresponding movement of the actuable member relative to the body section,
wherein the actuable member comprises a flexible member, and wherein the plurality of cables co-operate with the flexible member, such that movement of a cable relative to the body section in a direction along the length of said cable causes corresponding movement of the flexible member relative to the body section.

9. The structure according to claim 8, wherein each cable engages with the flexible member at an end of the cable, such that the positions of the respective engaging ends of said cables are spaced along an extent of the flexible member.

10. The structure according to claim 8, wherein the flexible member defines an aperture of the structure.

11. The structure according to claim 10, comprising a control means for adjusting the position of the aperture with respect to the body section.

12. The structure according to claim 11, wherein the control means comprises a first link which engages with a first cable of said cables and lies in a non-parallel direction to said cable, such that movement of the first link along an axis of the first link causes corresponding movement of the first cable in a direction of the axis.

13. The structure according to claim 12, comprising a second link which engages with a second cable of said cables, connected to the first cable, the arrangement being such that differential movement of the first and second links causes rotation of the flexible member.

14. The structure according to claim 8, wherein each said cable carries a damper affixed thereto, to control rotational movement of said cable relative to the body section.

15. The structure according to claim 1, wherein the structure is formed as a body suitable for stop-motion animation.

16. The structure according to claim 1, wherein the cable-receiving aperture comprises a channel formed in the body section.

17. The structure according to claim 1, wherein the cable is driven in a direction along a length of the cable by an actuator.

18. The structure according to claim 1, further comprising a covering layer which at least partially covers the structure, and wherein the cable is carried underneath the covering layer.

19. The structure according to claim 1, wherein the cable is fixedly attached to the structure at a point along the length of said cable, such that said cable has at least one free end.

20. A kit of parts comprising:
at least one resiliently deformable elongate member, said member comprising at least one aperture and at least one protrusion extending from a surface of said member, and
a plurality of resiliently deformable cables with means for attachment to said protrusions,
said at least one aperture being dimensioned so as to retain a length of one of said plurality of cables within said at least one aperture in use while permitting relative movement of said cable relative to the aperture in a direction along the length of the cable upon application of a set manipulating force.

* * * * *